United States Patent [19]

Nakayashiki et al.

[11] Patent Number: 4,899,142
[45] Date of Patent: Feb. 6, 1990

[54] RING NETWORK SYSTEM AND CONFIGURATION CONTROL METHOD

[75] Inventors: Susumu Nakayashiki, Yokohama; Jiro Kashio, Kawasaki; Takeshi Harakawa; Yoshinori Bekki, both of Hadano; Mitsuhiro Yamaga, Kawasaki, all of Japan

[73] Assignee: Hitachi, Ltd., Tokyo, Japan

[21] Appl. No.: 46,031

[22] Filed: May 4, 1987

[30] Foreign Application Priority Data

May 2, 1986 [JP] Japan .................. 61-100902
Jul. 18, 1986 [JP] Japan .................. 61-167919

[51] Int. Cl.⁴ .................. H04Q 3/00; H04J 3/14
[52] U.S. Cl. .................. 340/825.050; 340/825.16; 340/827; 370/16; 370/85.15; 371/11.2
[58] Field of Search ......... 340/825.05, 825.01–825.04, 340/825.06, 825.16, 825.5; 370/86–89, 13, 15, 16, 85; 371/11

[56] References Cited

U.S. PATENT DOCUMENTS

| | | | |
|---|---|---|---|
| 3,732,543 | 5/1973 | Rocher et al. | 370/88 |
| 4,510,493 | 4/1985 | Bux et al. | 340/825.05 |
| 4,538,264 | 8/1985 | Bahr et al. | 371/11 |
| 4,596,982 | 6/1986 | Bahr et al. | 340/825.05 |
| 4,623,884 | 11/1986 | Ihara et al. | 340/825.05 |
| 4,709,365 | 11/1987 | Beale et al. | 371/11 |
| 4,710,915 | 12/1987 | Kitahara | 370/88 |
| 4,763,315 | 8/1988 | Nakayashiki et al. | 370/15 |
| 4,777,330 | 10/1988 | Nakayashiki et al. | 340/825.05 |

FOREIGN PATENT DOCUMENTS 1979040 11/1983 Japan .
50639 3/1984 Japan .
120633 6/1985 Japan .

Primary Examiner—Donald J. Yusko
Assistant Examiner—Edwin C. Holloway, III
Attorney, Agent, or Firm—Antonelli, Terry & Wands

[57] ABSTRACT

A ring network system in which a plurality of line concentrators each having terminal stations connected thereto through respective branch lines are interconnected through at least one ring transmission lines. Each line concentrator includes configuration control switches capable of disconnecting from the ring transmission line all the branch lines placed under control of the line concentrator while holding the ring transmission line in the state to allow communication. The branch line(s) disconnected from the ring transmission line form(s) a local ring through cooperation with an internal transmission line. The line concentrator detected abnormality of communication or the line concentrator to be set to the rest state can undergo internal diagnosis operation or continue to be in the rest state without disturbing the communication among other line concentrators. At activation of the line concentrators, any of them may be activated arbitrarily and independently from each other by again connecting the branch lines to the ring transmission lines.

22 Claims, 22 Drawing Sheets

LINE CONCENTRATOR

LINE CONCENTRATOR

RING NETWORK SYSTEM AND CONFIGURATION CONTROL METHOD

BACKGROUND OF THE INVENTION

The present invention generally relates to a ring network system. More particularly, the invention is concerned with a configuration control for a ring network including a plurality of line concentrators mutually interconnected through at least one and preferably two transmission lines, in which configuration control is intended to deal with faults possibly occurring in the ring network as well as extension thereof.

In a ring network system, a plurality of line concentrators (also referred to as the wiring concentrators) are interconnected through first and second transmission lines having transmission directions opposite to each other (i.e. duplex or double transmission line path), wherein each of the line concentrators has a plurality of terminal stations (hereinafter referred to also as ST in abbreviation) connected thereto. Signal transmission among the STs is ordinarily conducted through the first ring transmission line serving as the primary transmission line while the second transmission line is employed as an auxiliary or stand-by transmission line and thus may be referred to as the sub-transmission line.

As is disclosed, for example, in an article entitled "Local Area Network in Token Ring System" contained in the monthly periodical "BIT" published by Kyoritsu Shuppan Co. Ltd. in Japan, Vol. 16, No. 3 (1984), there is known a star ring network system in which a plurality of ports are provided on the first ring transmission line within each of the line concentrators, wherein a plurality of the STs are linked to the ports through branch lines, spurs or lobes in a star-like configuration. Although the star ring network system of the configuration mentioned above is advantageous in that the line concentrators and all the terminal stations or STs can be controlled with a single ring control protocol, the system suffers a disadvantage that a fault which occurs in the branch line of the line concentrator or ST provides an obstacle to prevent the data transmission over the whole network system.

To deal with the abovementioned difficulty, each of the line concentrators is provided with a control station terminal or control ST connected to the first ring transmission line at a position most downstream thereof, wherein the control ST is imparted with functions to disconnect the failed port (by forming a bypass) or establish/release a loop-back path between two ring transmission lines. More specifically, each of the STs incorporated in the network system is allocated with an identifier (e.g. port identification number) for identifying the location of the ST in the line concentrator to which the ST is connected, wherein the ST which detects abnormality of the network system is caused to issue an abnormality notification frame (also referred to as beacon frame) including the identifier (port number). Another ST which received the abnormality notification frame relays it to a succeeding ST. In that case, when an ST which is issuing the abnormality notification frame receives a similar abnormality notification frame from other ST located upstream, the former terminates the operation of sending out its own abnormality notification frame or beacon. With this arrangement, only the ST located at a position immediately downstream of the location where fault occurs is not allowed to receive the abnormality notification frame issued by an ST located upstream and thus continues to send out the abnormality notification frame. Each control ST checks the identifier contained in the abnormality notification frame. If the ST issuing the abnormality notification frame is found to be present in the sphere under control of the control ST, the latter performs an operation required to deal with the fault such as, for example, establishment of a bypass for the port suffering the fault.

In Japanese Patent Application No. 60-26236 (Japanese Patent Application Laid-Open No. 187441/1986) corresponding to U.S. patent application No. 828,975 which issued into U.S. Pat. No. 4,777,330, there is disclosed such a network configuration in which each of the line concentrators includes a plurality of first switches for selectively connecting the ports for connection of STs to a first ring transmission line or selectively bypassing the ports and a pair of second switches for short-circuiting the first and second ring transmission lines at the input and output terminals of the associated line concentrator, wherein upon occurrence of fault in an area which is under control of a certain line concentrator, the second switches of that line concentrator are actuated to thereby form a local ring or internal ring which is closed within that line concentrator. With this arrangement, it is possible to determine the location where the fault occurs within the line concentrator by modifying the combination of the ports included in the local ring by means of the first switches while sending a test frame from the control ST to the internal ring to thereby check whether the test frame can circulate along the local ring. If the fault takes place in a branch line connected to a certain port or in an ST connected to the branch line, the second switches can be restored with the associated port remaining in the bypassed state to thereby restore the network to the normal state.

The hitherto known network configuration control system for the ring network system mentioned above is however disadvantageous in that the network system continues to remain in the state containing the fault location with the communication function of the whole ring network system being lost until the location where the fault occurs has been identified and separated or disconnected from the ring network system. More specifically, a lot of time is required to restore the communication from an ST positioned upstream of the fault location to an ST positioned downstream thereof. In other words, the line concentrator suffering the fault exerts adverse influence to the other normal line concentrators, thus giving rise to a problem.

On the other hand, when a fault occurs in a duplex transmission path, the loop-back paths are formed within both the line concentrators positioned on both sides of the location where the fault occurs, whereby communication among the individual STs can be conducted through a loop constituted by the first and second transmission lines. In that case, the network system requires a restoration monitoring function for allowing the network to be restored to the normal state rapidly by releasing the loop-back path upon removal of the fault. As a method of monitoring the restoration from the faulty state, there may be mentioned those disclosed in Japanese Patent Application Laid-Open Nos. 197940/1983 (JP-A-58-197940), 50639/1984 (JP-A-59-50639) and 120633/1985 (JP-A-60-120633). According to these methods, the line concentrator or ST (designated by ST#A) positioned adjacent to a failed location on one side thereof sends out a sort of monitor signal toward a line concentrator or ST (denoted by ST#B) positioned adjacent to the failed location on the other side thereof, wherein restoration from the faulty state is detected on the basis of whether the ST#B could receive the abovementioned monitor signal or not.

According to an open systems interconnection (OSI) model recommended by the International Standard Organization (ISO), the first lower rank layer is physical (PHY) and the second lower rank layer is a data link control (DLC) layer. The DLC layer is classified into further lower levels of a medium access control (MAC) and a logical link control (LLC). In the case of communication at the MAC level, it is required to assure that a token can be normally circulated between two STs, by way of example. In this connection, it is noted that according to the hitherto known restoration monitoring method mentioned above, the reception of the monitor signal is checked in the state in which the first and second transmission lines are independent of each other (i.e. these lines are not linked together in a loop). Consequently, although the reception of the monitor signal at the ST#B can assure the normality at the PHY level, it can not ensure the normality at the MAC level.

SUMMARY OF THE INVENTION

An object of the present invention is to provide a ring network system in which upon occurrence of a fault, the communication function of the whole network can be rapidly restored.

Another object of the present invention is to provide a ring network system in which the normality of communication at the MAC level can be confirmed at the time of restoration from the faulty state.

Still another object of the present invention is to provide a configuration control method for a ring network system which is capable of reducing a period during which the communication function of the whole network is interrupted upon occurrence of a fault.

A further object of the present invention is to provide a configuration control method for a ring network system which method is suited for extending the network scale by adding stations put into operation (activated) from the rest state or restored from the faulty state.

A still further object of the present invention is to provide a network monitoring method which can ensure the normality of communication at the MAC level upon linking of two network portions.

In view of the above objects, there is provided according to an aspect of the present invention a network system which comprises a plurality of line concentrators each having at least a terminal station connected thereto by way of a branch line and at least one ring transmission line for interconnecting the plurality of line concentrators in a ring-like configuration, wherein each of the line concentrators includes an internal transmission line for connecting the branch lines in series to the ring transmission line, and switch means for configuring the internal transmission line to a local ring which is independent of the ring transmission line without interrupting the ring transmission line.

With the abovementioned arrangement of each line concentrator, a line concentrator which detects abnormality occurring in the sphere to be supervised by that line concentrator can disconnect the internal transmission line thereof from the ring transmission line, whereby the normal communication state can be restored in which other normal line concentrators are interconnected by the ring transmission line free of the faulty location. Further, because the internal transmission line disconnected from the ring transmission line constitutes one local ring, a diagnosis operation for identifying the location where fault occurs can be performed without providing any obstacle to the communication among other line concentrators by sending out a test frame to the local ring with branch lines being successively connected to the local rings on a step-by-step basis and checking whether the test frame can travel around through the local rings.

Once a branch line suffering a fault has been identified, the branch line is disconnected from the internal transmission line and subsequently the local ring is opened to allow the internal transmission line to be linked to the ring transmission line, whereby the terminal station connected to the aforementioned internal transmission line can be restored to be incorporated in the ring network system. These configuration control operations can be performed by a communication controller disposed on the internal transmission line.

By adopting the line concentrator structure according to the invention described above, the line concentrator set to the rest state is capable of disconnecting the station supervised by that line concentrator from the network without interrupting the ring transmission line so that the communication among the other operating line concentrators can not be disturbed. When the resting line concentrator regains operability, it can be added to the network by linking the internal transmission line to the ring transmission line, which in turn means that extension of the network is facilitated.

Next, a large scale network system with a long-distance ring transmission line will be considered. Assuming that one line concentrator of such a large scale network is activated from the state in which all the line concentrators are not operating, there may arise such a situation that the signal sent out from the activated line concentrator undergoes attenuation on the ring transmission line and can not travel around the ring normally. Further, the signal may possibly be prevented from traveling around the ring due to occurrence of fault or obstacle on the ring transmission line.

With an arrangement in which the individual line concentrators are interconnected through first and second ring transmission lines having respective transmission directions opposite to each other with a loop-back path being provided between the first and second ring transmission lines, communication can be conducted over a network of reduced scale. When the line concentrator according to the present invention is applied to the duplex ring transmission line network mentioned above, it becomes possible to extend the network by successively linking new local rings put into operation after recovery of an associated line concentrator from the faulty state or activation of additional line concentrators to the operating local ring after having confirmed that the normal communication can be performed at the MAC level.

For the purpose of diagnosing the possibility of communication over the ring transmission line, the newly activated or thrown-in line concentrator (the concentrator put to the operating state) may send out a test signal. Unless the test signal returns within a predetermined time, the transmission line is set to the local ring state, to allow the inter-ST communication to be started over a minimum scale network established in the sphere covered by the associated line concentrator (This mode is referred to as ISOL mode). For detecting the throw-in or activation of other line concentrator or restoration from the faulty state, the line concentrator in the ISOL mode is commanded to send out a first control signal to the first ring transmission path. Upon reception of the first control signal from the first ring transmission line on the side upstream, the line concentrator under consideration makes decision as to whether the received control signal is the one sent out by that concentrator. If so, the line concentrator under consideration decides that the first ring transmission line resumes the normal state and connects the internal transmission line to the first ring transmission line to regain the normal state (referred to as NORM mode). On the other hand, when the first control signal received from the first transmission line on the side upstream of the line concentrator in concern is found to be the one issued by other line concentrator, the line concentrator in concern which is in the ISOL mode responds to the received control signal to send out a second control signal onto the second ring transmission line. The line concentrator which receives both the first and second control signals decides then that other operating line concentrators are present upstream and downstream and regains the NORM mode. In contrast, the line concentrator which can receive only one of the two control signals decides that it is located at a position most upstream or downstream in a test ring mentioned below, to thereby establish a loop-back path extending to the first ring transmission line from the second ring transmission line (referred to HEAD mode) while establishing another loop-back path extending to the second ring transmission line from the first ring transmission line (referred to TAIL mode). Through the operation to establish these loop-back paths, one local test ring including the first and second ring transmission lines is realized. Since this test ring is independent of the local rings which are already in the operating state, it is possible to conduct a test operation on the test ring for confirming the normality of communication at the MAC level without exerting influence to the local rings. The line concentrator in the TAIL or HEAD mode links the test ring whose normality has been confirmed to the local ring used already in that line concentrator. In this way, the network is extended. The line concentrator in the TAIL mode continues to send out the first control signal onto the first ring transmission line for extending the network in the direction downstream, while the line concentrator in the HEAD mode continues to monitor the arrival of the first control signal from the side upstream. After the linking of the respective test rings established subsequently, the concentrators in both modes assume the NORM mode. According to the present invention, a plurality of line concentrators thrown in simultaneously can be included in a single test ring, to thereby allow the network to be extended rapidly.

The foregoing and other objects, advantages, manner of operation and novel features of the present invention will be better understood from the following detailed description when read in connection with the accompanying drawings.

DESCRIPTION OF THE PREFERRED EMBODIMENTS

Figure 1:
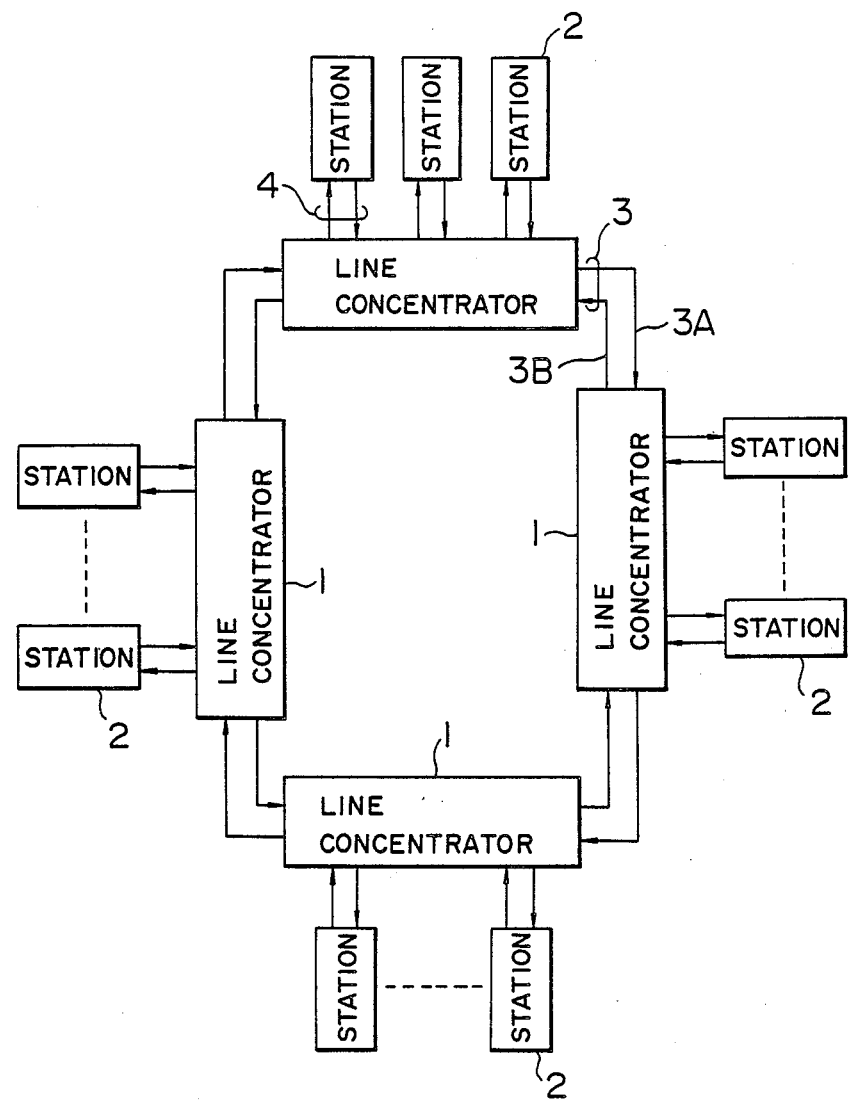
FIG. 1 is a view showing a general arrangement of a ring network system to which the present invention can be applied.

FIG. 1 shows a general arrangement of a network system to which the present invention can be applied. In this figure, reference numeral 1 denotes line concentrators, respectively, 2 denotes terminal stations (ST) each connected to the associated line concentrator, 3 denotes a duplex or double transmission path constituted by a first ring transmission line 3A and a second ring transmission line 3B for interconnecting the individual line concentrators 1, a numeral 4 denotes a branch line for connecting terminal ST to the ring transmission lines.

Figure 2:
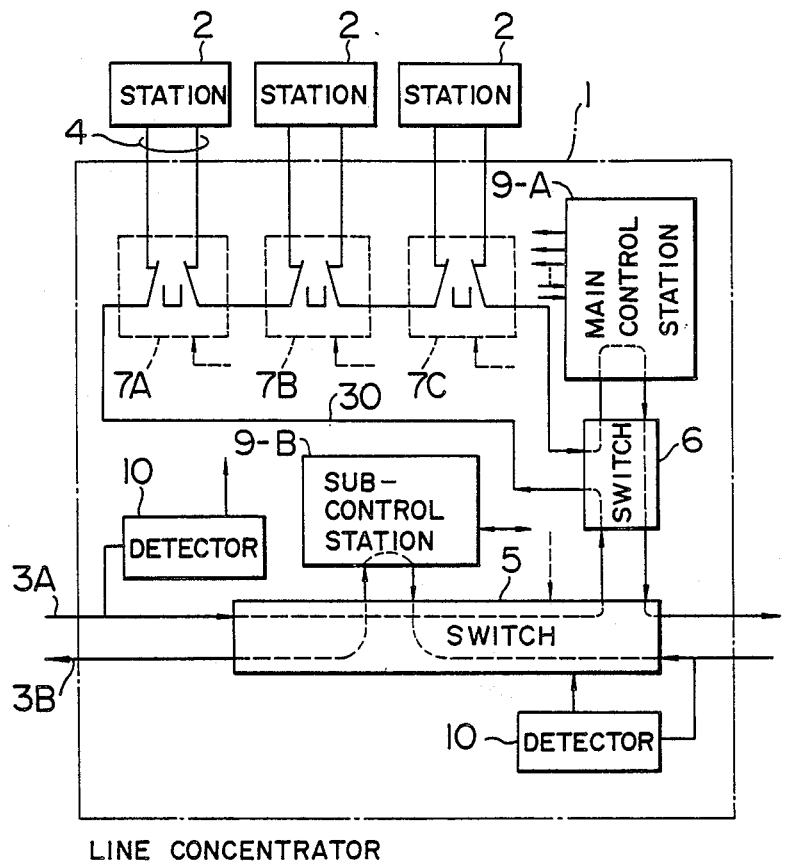
FIG. 2 is a view showing a structure of a line concentrator according to an embodiment of the present invention.
Figure 3:
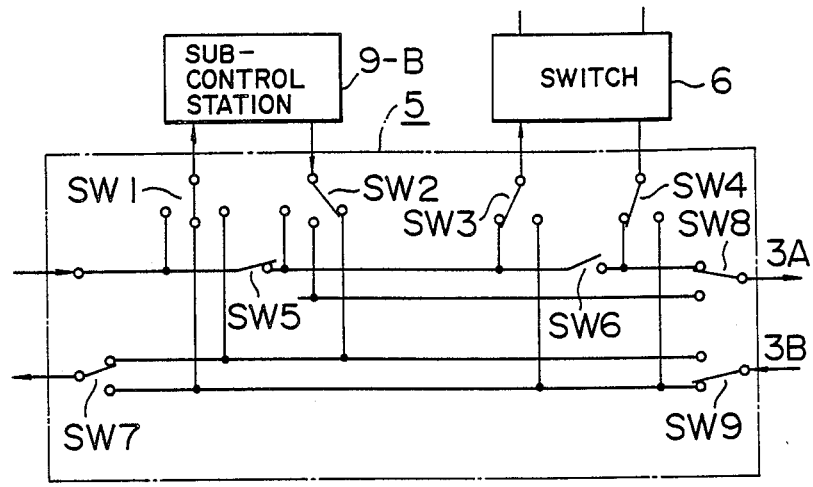
FIG. 3 is a view showing, by way of example, a basic arrangement of a switch circuit (5) employed in the line concentrator shown in FIG. 2.

FIG. 2 shows an internal structure of one line concentrator 1, in which reference numerals 1 to 4 denote same components as those shown in FIG. 1. A numeral 5 denotes a switch circuit serving for establishing loop-back to the second ring transmission line 3B from the first ring transmission line 3A or vice versa for dealing with abnormality which may occur in the transmission line. A numeral 6 denotes a switch circuit for establishing a local ring (ISOL) to allow communication among only the terminal stations or ST connected to the line concentrator under consideration and for linking the local ring to the duplex ring transmission path, reference symbols 7A to 7C denote branch line bypass switches each for selectively connecting or disconnecting the associated branch line 4 to or from the internal transmission line 30 for the local ring (these switches are collectively denoted by a numeral 7), reference symbols 9-A and 9-B (collectively represented by 9) denote communication controllers (referred to as the control station or ST) for performing various tests and controls such as the test of the local ring, controlling operation for testing the normality of a ring transmission line portion to be newly added for extension of the network, control of the various switches including those mentioned above, and control of communication over the network by communicating with the terminal stations 2 and other communication control equipment. The communication controller 9-A will be referred to as the main control station while the communication controller 9-B will be termed sub-control station. The main control station 9-A and the sub-control station 9-B are imparted with the function to communicate with each other. By realizing each of the control stations 9-A and 9-B in a same structure capable of performing identical functions, the main control station 9-A and the subcontrol station can be replaced by each other. A reference numeral 10 denotes an activation signal detecting circuit for detecting the activation of the line concentrator upon power-on as well as restoration from faulty state on the basis of a preset current value or the like. FIG. 3 shows an internal structure of the switch circuit 5. This switch circuit 5 includes a plurality of switches SW1 to SW9 for changing over the interconnections between the ring transmission lines 3A and 3B and the sub-control station 9-B and between the ring transmission lines 3A and 3B and the switch circuit 6.

With the arrangement of the network system described above, the configuration control of the network upon occurrence of a fault according to a first exemplary embodiment will be elucidated below.

In the following description, it is assumed that protocol disclosed in "Token Ring Access Method and Physical Layer Specifications" contained in IEEE STd. 802.5, 1985 (ISO/DP 8802/5) is adopted. According to this protocol, each of the terminal stations or STs (i.e. the ST 2 and the control ST 9-A and 9-B shown in FIG. 1) performs the following functions:

(1) Upon detection of abnormality in the ring, each ST issues an abnormality notification frame referred to as beacon or BCN in abbreviation. Since the ring behaves like a serial system, the ring abnormality is detected by all the STs. At the time point when each ST sends out the BCN, any faulty location is not yet identified.

(2) When a given ST receives the BCN, the ST decides that there exists upstream of the ST at least one ST which has detected the abnormality, whereupon the ST stops the issuing of its own BCN to localize the faulty location and transits to the state in which the received BCN is relayed to the STs disposed downstream of that given ST. In this connection, meanings of the terms "upstream" and "downstream" can be definitely determined on the basis of the directions in which the data is transferred through the ring transmission path.

(3) Such assumption is adopted that an ST continuing to send out the BCN for a duration longer than a predetermined time span is disposed close to the faulty location on the ring and that the fault occurs in the coverage area or sphere to be supervised by the above-mentioned ST, i.e. the fault is occurring in the stretch between the transmitter of the abovementioned ST and the receiver of the ST located downstream adjacent thereto.

(4) When a given ST receives the its own BCN issued by itself, it is decided that the BCN has traveled once around the ring, i.e. the closed ring transmission line has been established, whereupon the ST stops the issuing of the BCN. Subsequently, the ring communication protocol function is initiated again on the ring through token control.

Figure 4:
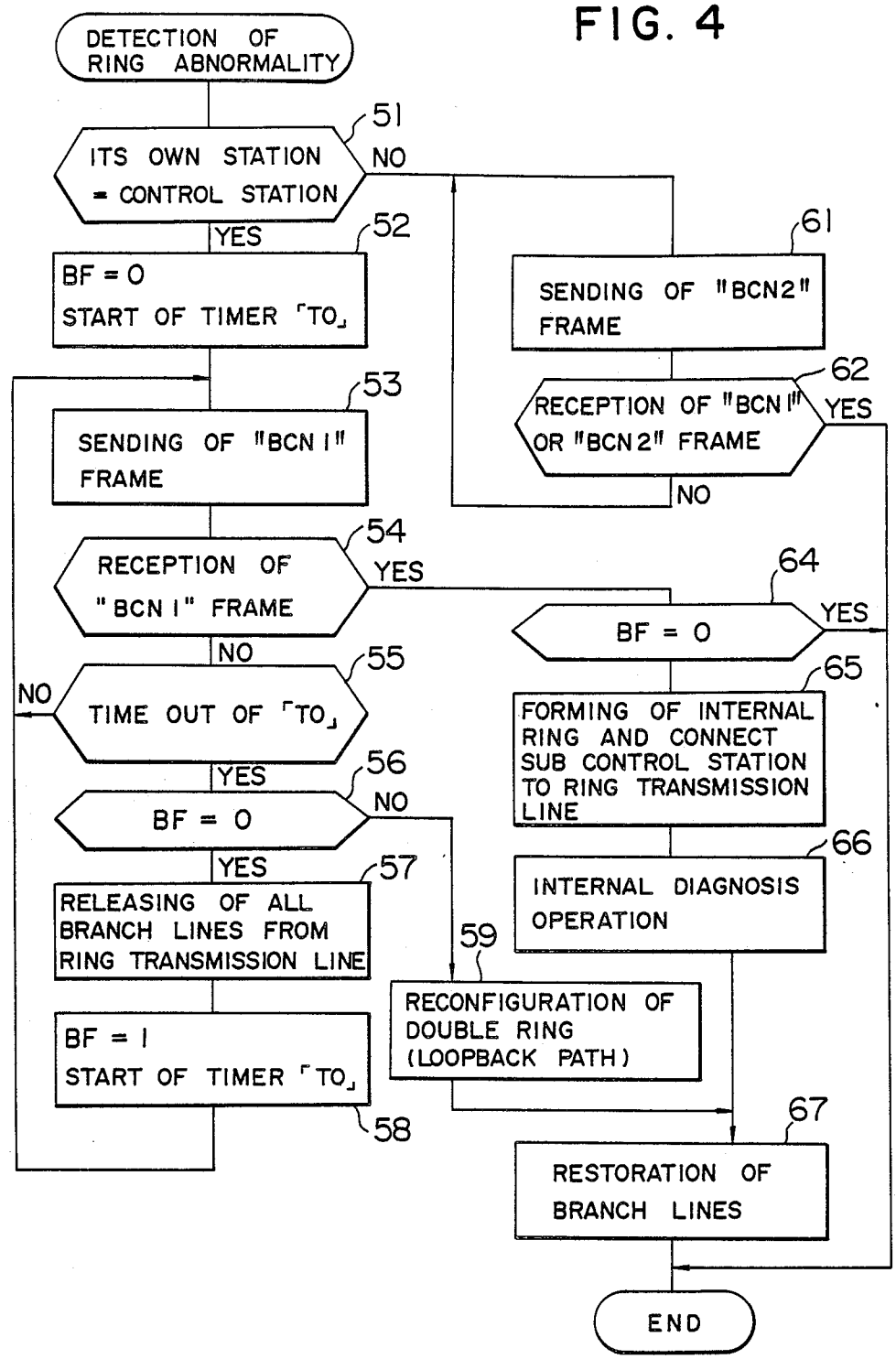
FIG. 4 is a view showing a flow chart for illustrating control operation performed by individual stations upon detection of ring abnormality.

FIG. 4 illustrates in a flow chart the control operations performed by each ST upon detection of ring abnormality.

As described before, upon detection of ring abnormality, each ST sends out the abnormality notification frame or BCN (beacon). In that case, the ST makes decision as to whether it is to serve as the control ST or as one of the common STs (step 51). When an ST under consideration is the control ST, a branch disconnection flag (BF) is set to "0" to start a timer (TO) for monitoring reception of the BCN (step 52), being followed by issuing of a first abnormality notification frame or BCN1 allocated to that control ST (step 53). On the other hand, when the ST under consideration is other than the control ST, the ST under consideration sends out a second abnormality notification frame or BCN2 to the common STs at a step 61. The reason why the different BCNs are transmitted in dependence on the types of the STs which detect the ring abnormality is to identify or specify the line concentrator for which measures to eliminate the fault should be taken. When a given one of the control STs continues to issue the BCN1 for a duration longer than a predetermined time, it is decided according to the aforementioned protocol (3) that the given control ST is located most upstream on the ring when viewed from the faulty location as the origin, and the line concentrator to which the given control ST belongs is designated as the one for which measures for restoration from the faulty state should be taken.

Figure 5:
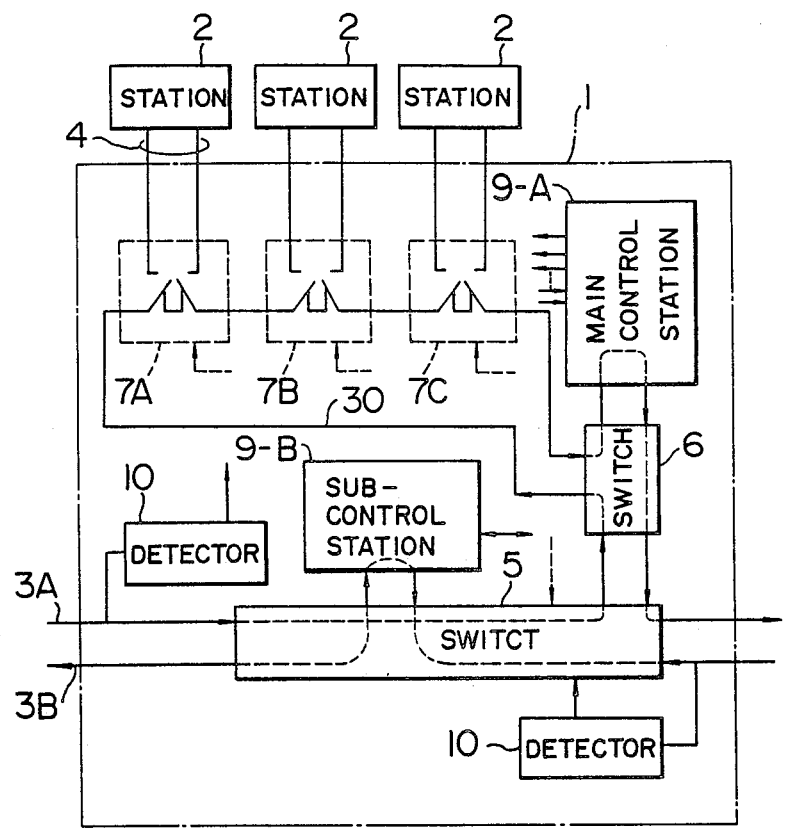
FIGS. 5 to 8 are views for illustrating changes in the internal state of a line concentrator taking place upon detection of ring abnormality.

When the common STs issuing the respective BCN2s receives the BCN1 or BCN2 on the side upstream thereof, these common STs resume the normal operation (step 62). The control ST issuing the BCN1 is in the state waiting for the reception of that BCN1 from the side upstream (steps 54, 55). When the time set at the timer TO has elapsed without receiving the BCN1 (timeout), the ST under consideration decides that it is located most upstream on the ring and should undergo the fault eliminating procedure. However, at this time point, it is not yet determined whether the fault occurs within the associated line concentrator, e.g. at the branch line 4 or the terminal ST 2 or on the duplex transmission path between the associated line concentrator and the one disposed upstream thereof. Accordingly, the control ST checks the state of the flag BF (step 56) and, if the flag BF is "0", the branch bypass switches 7A and 7B are changed over such that all the branch lines 4 are disconnected (step 57), as is shown in FIG. 5. Subsequently, the flag BF is set to "1" to initiate again the counting operation of the timer TO (step 58) to regain the step 53 of sending out the BCN1. The BCN1 sent out in the state in which all the branch lines are disconnected as mentioned above must come back to the control ST which has sent out that BCN1 after the travel around the ring transmission line provided that the faulty location is present in either one of the branch lines 4 or the associated terminal ST. On the contrary, when the fault is present on the double ring transmission lines, the time-out of the timer TO will take place again.

Figure 6:
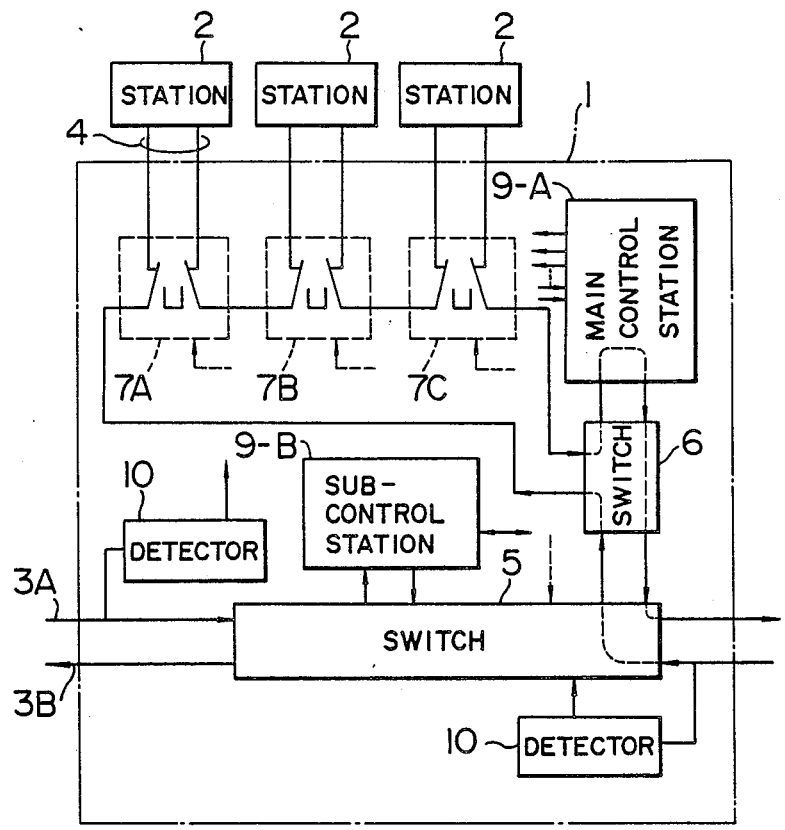

Thus, it is determined that the fault occurs on the first ring transmission line 3A unless the flag BF is "0" at the time point when the time set at the timer TO has just elapsed. Then, reconfiguration of the double ring transmission lines is executed at the step 59, wherein a loopback path is established, for example, from the second ring transmission line 3B to the first ring transmission line 3A, as is shown in FIG. 6. At a step 67, the switches 7A to 7C are changed back to the original state to allow the respective branch lines to be connected to the internal transmission line 30. The fault eliminating processing then comes to an end.

In connection with the reconfiguration of the double ring transmission lines, it should be understood that the reconfiguration necessarily includes in addition to the establishment of the loop-back path (first loop-back path) from the second to the first ring transmission path performed in the line concentrator to which the control ST detected the time-out of the BCN1 belongs, as described above, another loop-back (second loop-back) from the first ring transmission line 3A to the second ring transmission line 3B which is realized in the line cocentrator disposed on the side upstream. The second loop-back path may be established with such an arrangement that each control ST which has received the BCN1 on the first ring transmission line 3A sends out a beacon BCN1' onto the second ring transmission line 3B, while other control STs than that issuing the BCN1 are reset to the ordinary mode from the BCN1' transmission mode when they received BCN1' upstream from the second ring transmission line, as is proposed in Japanese Patent Application No. 60-26236 (Japanese Patent Application Laid-Open No. 189441/1986) corresponding to U.S. patent application No. 826,255 which issued as U.S. Pat No 4,763,315. In other words, only the control ST issuing the BCN1 is inhibited from performing the relaying operation on the second ring transmission line even when that control ST receives the BCN1' from other ST. By producing the dummy trunk fault on the second ring transmission line in this manner, only the control ST of the line concentrator disposed immediately downstream of the faulty location on the second ring transmission line is allowed to sustain continuously the BCN1' transmit mode. Consequently, the second loop-back is established in the abovementioned line concentrator.

Figure 7:
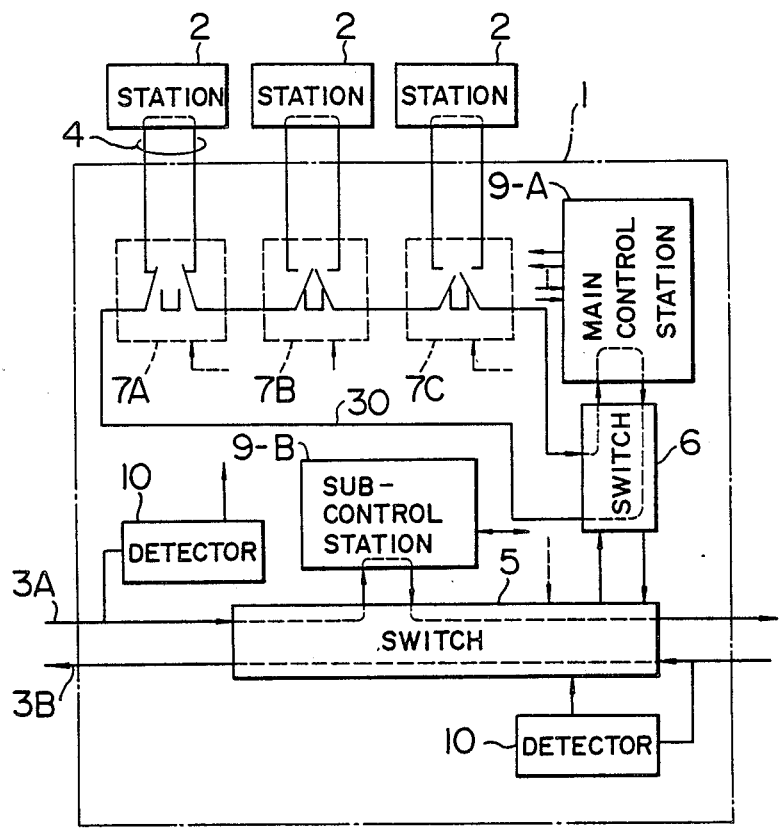

When the BCN1 is received at the decision step 54 shown in FIG. 4, a jump is made to a step 64 where the state of the flag BF is checked. If the flag BF is "0", it is decided that the fault has been removed or another control ST must be present upstream for which measures for removal of the fault should be taken. Accordingly, the control ST made the above decision regains the ordinary operation mode. On the other hand, when the flag BF is "1", the control ST decides that the faulty location is present within the associated line concentrator to which that ST belongs, whereupon the internal transmission line 30 is disconnected from the double ring transmission path 3 by means of the switch circuit 5 and the local ring (internal ring) is constituted by short-circuiting the internal transmission line 30 by means of the switch circuit 6 (step 65), as shown in FIG. 7. In that case, the sub-control ST 9-B is connected to the double ring transmission path 3 to perform the functions of the main control 9-A in place of the latter. In this way, the branch line or the terminal stations suffering the fault can be disconnected from the double ring transmission path, while the other line concentrators can regain the communication function without waiting for the completion of internal diagnosis operation conducted through the abovementioned local ring, which diagnosis operation will be described below.

Figure 8:
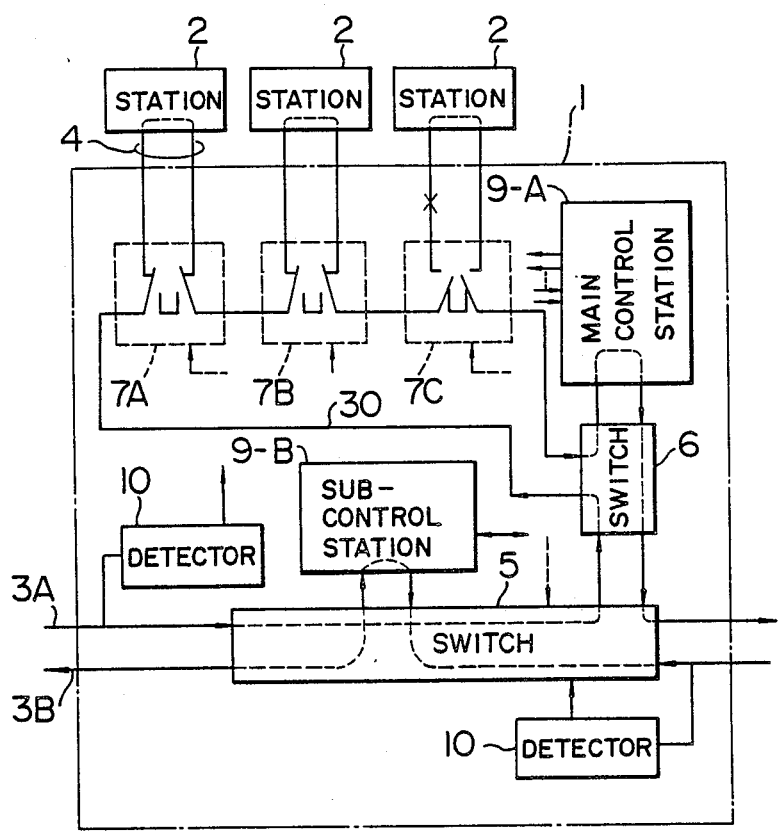

Referring to FIG. 7, the internal diagnosis operation can be conducted, for example, by connecting only the branch bypass switch 7A to the branch line while the other switches 7B and 7C are set to the state to bypass the respective branch lines. In this state, the main control ST 9-A sends out a test frame (e.g. a BCN) to thereby determine whether the test pattern can travel around the local ring or not. By changing over sucessively the branch lines connected to the local ring in this manner, it can be decided that the branch line connected to the local ring at the time point when the test frame fails to travel around the local ring suffers fault. When it is found, by way of example, that the branch line associated with the switch 7C suffers fault, as indicated by a mark X in FIG. 8, only the switch 7C is left in the bypass state with all the other switches 7A and 7B being connected to the respective branch lines. By restoring the switches 5 and 6 to the original state (step 67), the main control ST 9-A then completes the internal diagnosis of the associated line concentrator without disturbing the communication among the other line concentrators, to thereby allow the normal terminal ST to be reconnected to the ring network.

As will be appreciated from the foregoing description, in the network system according to the present invention, each of the line concentrators is equipped with the local ring for linking thereto the terminal branch lines, whereby the local ring can be disconnected from the double ring transmission path without interrupting it between the adjacent line concentrators disposed upstream and downstream, respectively. Upon detection of ring abnormality, the line concentrator which is decided to include a faulty location in the sphere set under control of that line concentrator operates to disconnect the local ring including the faulty location from the double ring transmission line path before entering the timeconsuming diagnosis operation. In this way, the internal diagnosis operation can be executed with the communication function through the double ring transmission line path having been restored among the other normal line concentrators. In other words, the network reconfiguration control according to the invention can be carried out by suppressing to a minimum the influence of the fault exerted to the whole ring network system.

In the foregoing description of the embodiment of the invention, it has been assumed that the line concentrators are interconnected by the first and second ring transmission lines. It should however be understood that the advantage derived from the internal diagnosis conducted with the local ring bypassing the ring transmission lines can also be obtained in the network system of the arrangement in which the line concentrators are interconnected by a single ring transmission line.

Next, a second exemplary embodiment of the present invention will be described which is based on the concept underlying the first embodiment described above and directed to the configuration control technique for extending the network.

Figure 9:
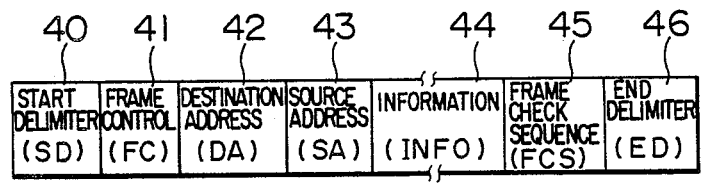
FIG. 9 is a view showing, by way of example, a format of a communication frame employed for the configuration control of the network according to the invention.

FIG. 9 shows, by way of example, a format of the communication frame used in conjunction with the second embodiment of the invention. In this figure, a reference numeral 40 designates a start delimiter (SD in abbreviation) indicating the start of the frame, 41 designates a frame control (FC) indicating the type of frame, 42 designates a dsstination address indicating the destination to which data is to be sent, 43 designates a source address (SA) indicating the source in which data to be transmitted originates, 44 designates information or data (INFO) to be transmitted, 45 designates a frame check sequence (FCS), and 46 designates an end delimiter (ED) indicating the end of the frame.

In the case of the embodiment now under consideration, there are made use of a ring circulation check frame (hereinafter referred to as RCC frame), a beacon reconfiguration frame (BR frame) and a reconfiguration acknowledge frame (RA frame) for the control purpose. In these frames for the control purpose, the DA 42 includes addresses for all the STs (for simultaneous notification), the SA 43 includes the address of the sender ST, and the INFO 44 includes data for text. Discrimination of the individual frames from one another is realized with the aid of the FC 41. It is now assumed that the FC 41 is of one-byte data. On the assumption, definition may be made such that when FC 41 is X'03', this indicates the RCC frame, the FC 41 of X'02' indicates the BR frame, and the FC 41 of X'04' indicates the RA frame. In this connection, it should be mentioned that the FC 41 of X'02' may indicate both the BR frame and RA frame, wherein discrimination of these two frames may be made by identifying the transmission line for reception. By way of example, the FC 41 of X'02' received from the first transmission line 3A may be defined as the BR frame, while the FC 41 of X'02' received from the second transmission line 3B may be defined as the RA frame. The FC 41 of the frame which is not used for the configuration control is to be given by X'00'.

FIGS. 10A to 10J illustrate on a time-serial basis a manner in which the line concentrators 1A to 1D constituting the ring network start operation at random, whereby the scale of the network (the number of operating STs) is progressively extended. It should be mentioned that in these figures, the structure of the individual line concentrators is shown only schematically for the purpose of clarification of illustration. More specifically, only the main control ST 9-A, the sub-control ST 9-B and the activation signal detecting circuit 10 of those shown in FIG. 2 are shown in FIGS. 10A to 10J in conjunction with the activated line concentrator.

Figure 10A:
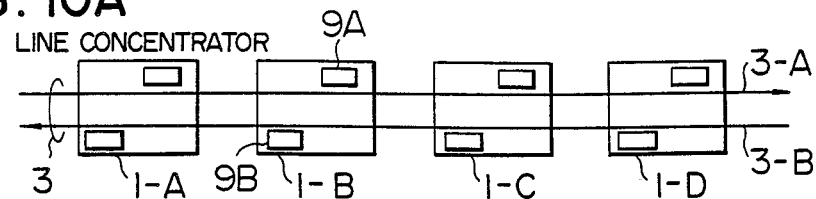
FIGS. 10A to 10J are views for illustrating on a time-serial basis a process through which the network is extended according to the teaching of the invention.
Figure 22:
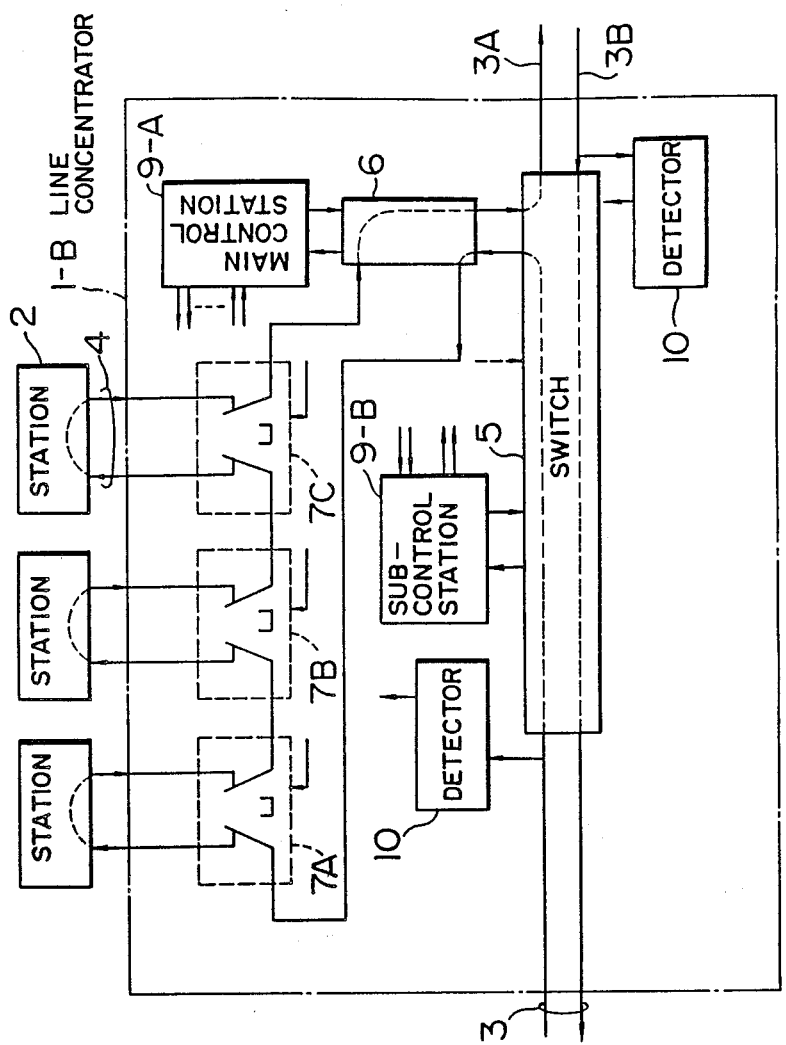
FIGS. 22 and 23 are views for illustrating the internal state of the line concentrator.
Figure 23:
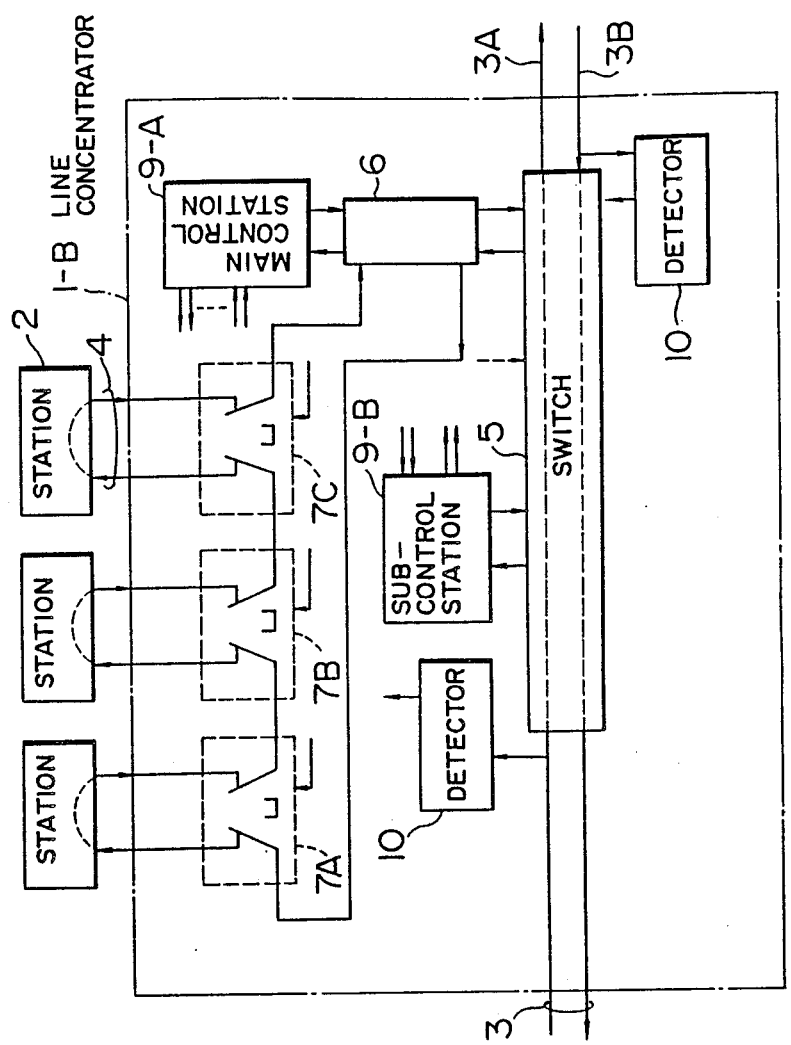

FIG. 10A shows the state in which none of the line concentrators is activated. In the line concentrator not yet activated (i.e. not connected to the power supply source), the local ring and the control STs (9A, 9B) are released or disconnected or bypassed from the transmission line path 3 so that the signal as received can be relayed intact. FIG. 22 shows the arrangement of the control stations 9-A and 9-B separated from the transmission line path, which is connected with the branch lines 4 so as to provide capability of communication between the stations 2 and the stations of other line concentrators. FIG. 23 shows the connection of the transmission line path 3 separated from both the terminal STs 2 and the control STs 9. With this arrangement, it is possible to perform communication from or between the activated line concentrator or concentrators with the resting line concentrator being interposed therebetween.

Figure 10B:
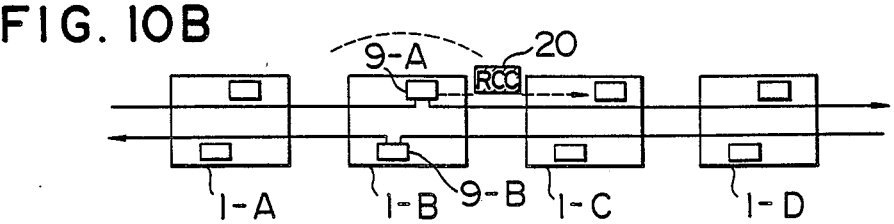
Figure 11:
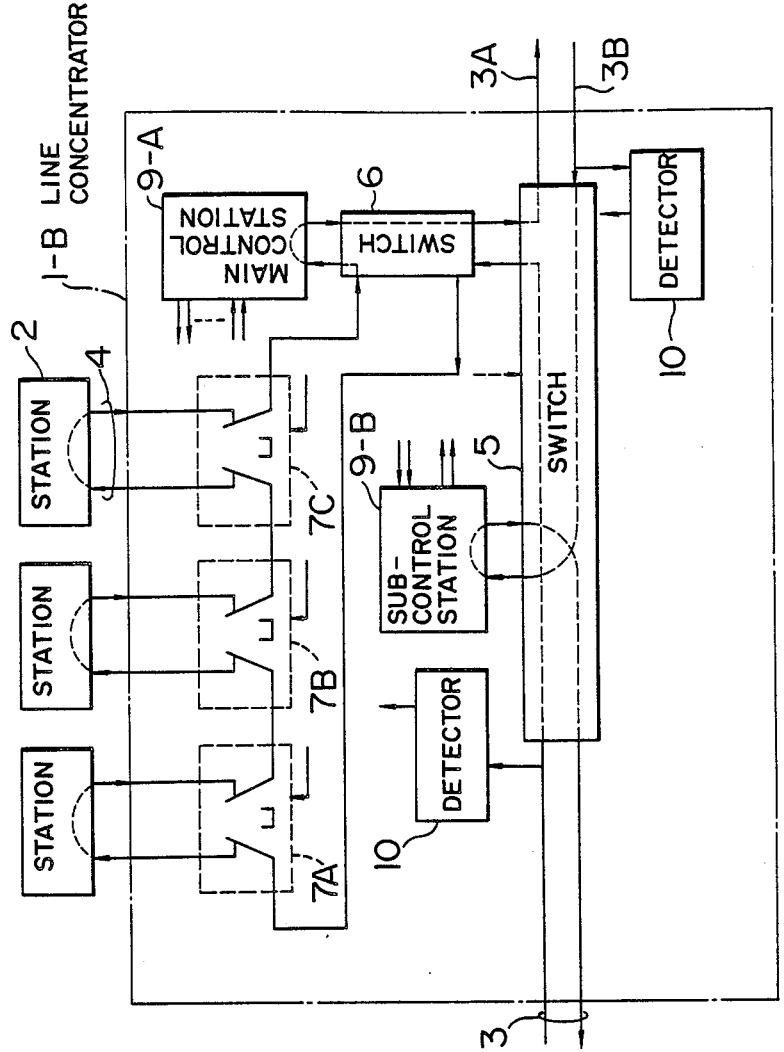
FIGS. 11 to 15 are views for illustrating primary changes taking place in the internal state of the line concentrator in the course of extending the network.

FIG. 10B shows the state of the network in which only the line concentrator 1-B is activated in the manner illustrated in FIG. 11. More specifically, the line concentrator 1-B sends out the ring circulation check (RCC) frame 20 through the main control ST 9-A to monitor whether this signal can return to the concentrator 1-B after having traveled around the ring transmission line 3 within a predetermined time. Unless the return of the above signal can be detected even after the lapse of the predetermined time, it is decided that the communication over the ring network through the transmission line 3 is impossible, and consequently the local ring switch circuit 6 is triggered to form the local ring closed within the line concentrator 1-B.

Figure 10C:
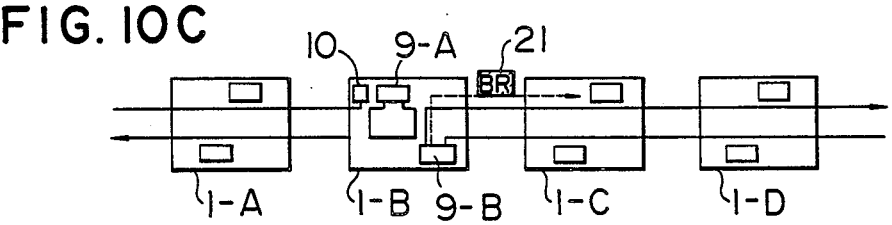
Figure 12:
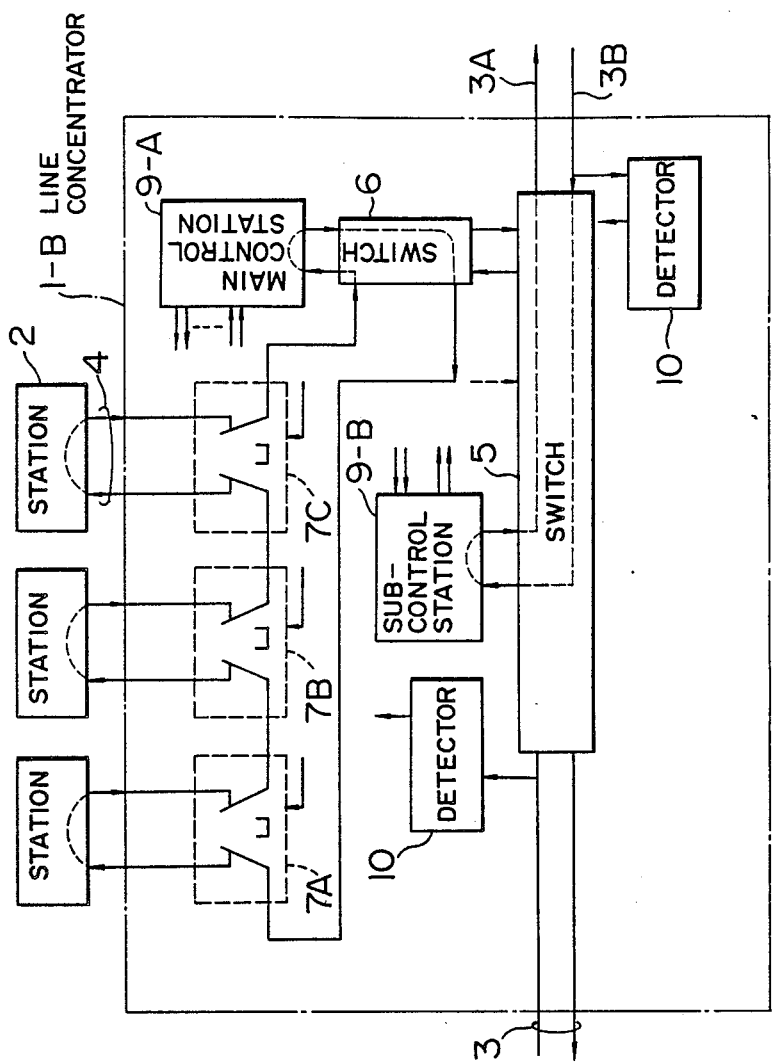
Figure 13:
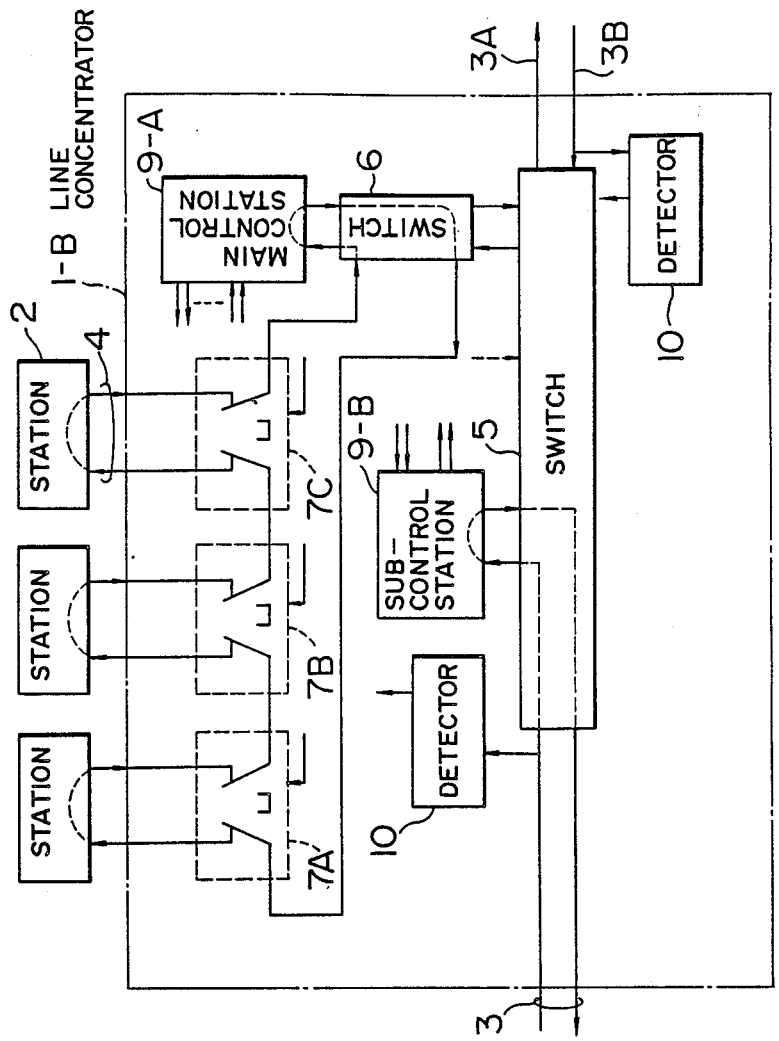

FIG. 10C shows the state in which the line concentrator 1-B is in the closed local ring mode (also referred to as the ISOL mode) illustrated in FIG. 12. In the case of the embodiment now being described, each line concentrator is in the ISOL mode when the test data can not travel around the first ring 3A, as described hereinbefore. This mode takes place when the transmission line suffers a fault or when the overall length of the transmission line 3 is too long for relaying the signal only through the activated line concentrator. In this ISOL mode, the beam reconfiguration (BR) frame 21 continues to be sent out on the first ring with a view to monitoring the activation of other line concentrators.

Figure 10D:
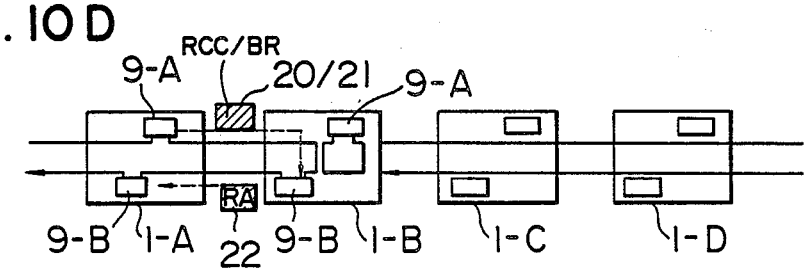

FIG. 10D shows the state in which the line concentrator 1-A has been additionally activated. When the line concentrator 1-A sends out the RCC frame 20, this is detected by the activaton signal detection circuit 10 of the line concentrator 1-B, whereupon the control of the sub-control ST 9-B is transferred to the line concentrator 1-A. When it is detected by the line concentrator 1-A that the RCC frame 20 can not travel around the ring, the line concentrator 1-A sends out the BR frame 21 before entering the ISOL mode. Upon reception of the BR frame 21, the line concentrator 1-B sends out the RA (reconfiguration acknowledge) frame 22 onto the second ring transmission line.

Figure 10E:
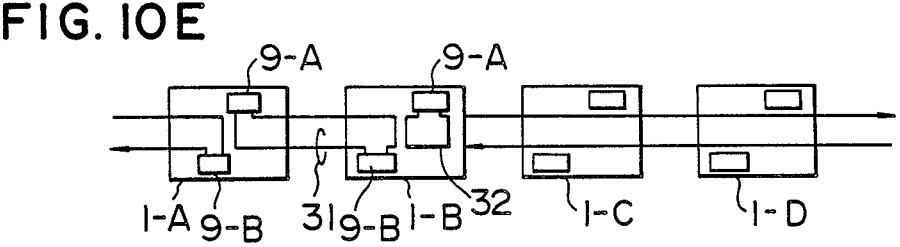
Figure 14:
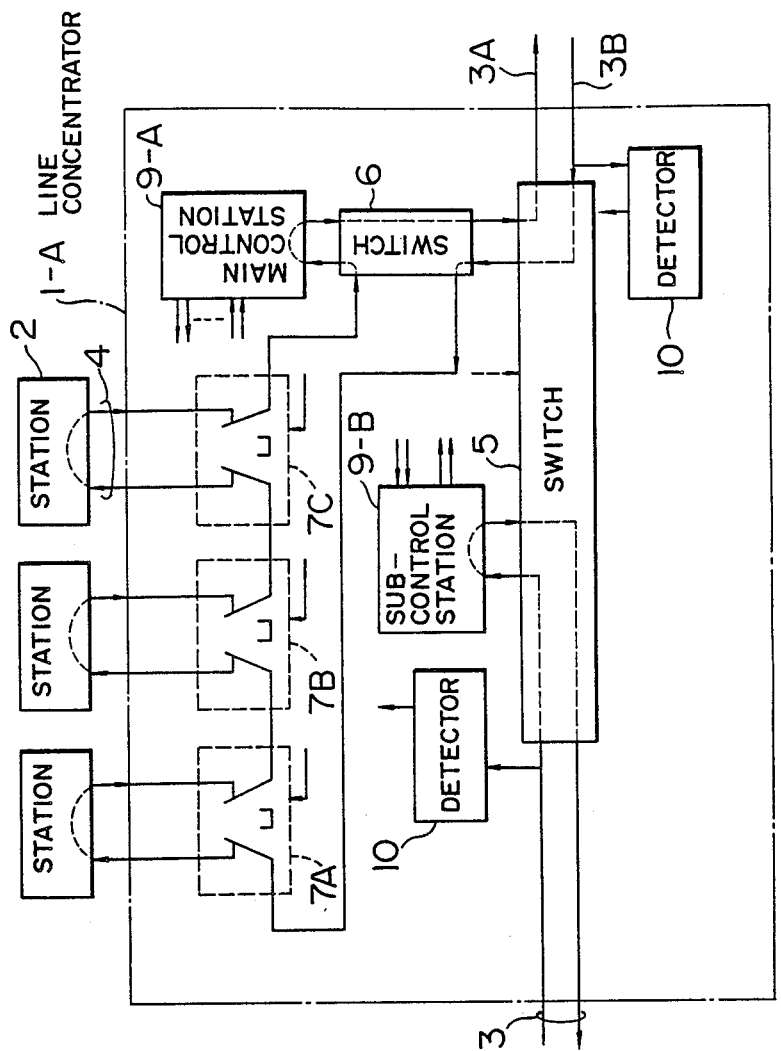

FIG. 10E shows the state in which the test ring is established. More specifically, the line concentrator 1-A is in the loop-back state (HEAD mode) in which the loop-back path is formed from the second ring transmission line 3-B to the first ring transmission line 3-A, as is shown in FIG. 14, because the RA frame 22 is received while the BR frame 21 is not received. Thus, the test ring 31 is established. Since the test ring 31 is independent of the local ring 32 which is already in the operative state, the normality of the test ring can be checked without exerting influence to the communication conducted through the local ring 32. Further, since the normality test can be performed through the test ring 31 of the ring configuration, the normality of the communication even at the MAC level can be ascertained.

For performing the test on the assumption that the ring network is of the token control type, the control STs 9-A and 9-B may be so implemented as to perform the test operation to the test ring 31 in accordance with the protocol stipulated in the "IEEE Standard 802.5" mentioned hereinbefore. Unless any fault is present on the test ring, the protocol is set to the stand-by state or active state. On the other hand, when fault is found on the test ring 31, the protocol is set to the abnormal state, i.e. the beacon state (abnormality notification state). In this manner, the normality of communication at the MAC level through the test ring can be confirmed.

Figure 10F:
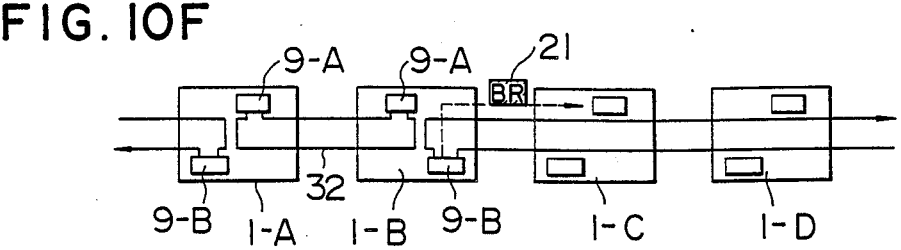
Figure 15:
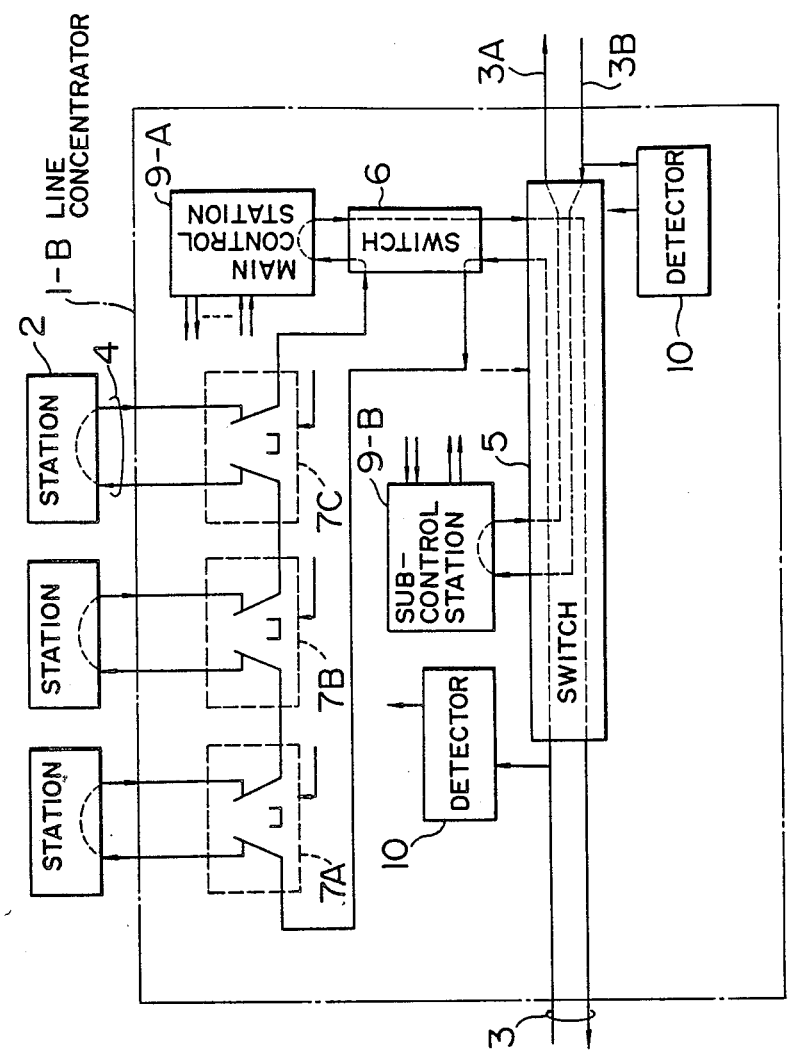

FIG. 10F shows extension of the network. When the normality of communication at the MAC level through the test ring has been ascertained, the test ring 31 is incorporated into the ring which has been already in the operating state, as shown in FIG. 10E, whereby the ring 32 is extended. The state of the line concentrator 1-B at this time point is shown in FIG. 15. The line concentrator 1-B in the loop-back state in which the loop-back path is formed from the first ring transmission line to the second ring transmission line (i.e. in TAIL mode) continues to send out the BR frame 21 onto the first ring through the operating ring 32.

Figure 10G:
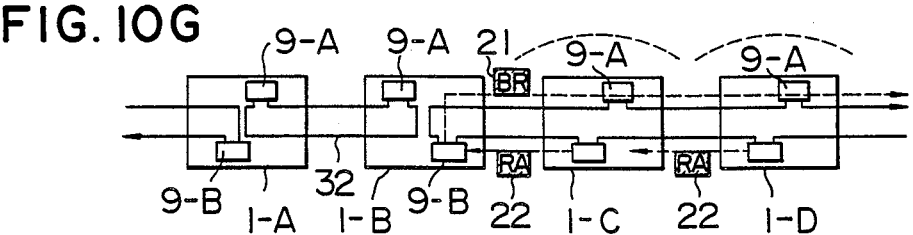

FIG. 10G shows the operating state in which a plurality of line concentrators exemplified by 1-C and 1-D are newly activated. In response to the reception of the BR frame 21, the line concentrators 1-C and 1-D send the RA frame 22 onto the second ring transmission line 3B.

Figure 10H:
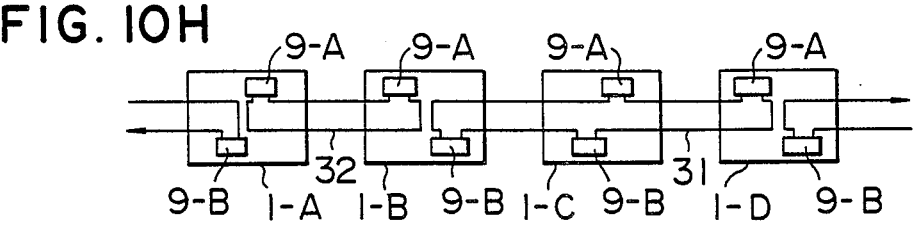

FIG. 10H shows the establishment of the test ring 31 including the plural activated line concentrators. The line concentrator 1-C receives the BR frame 21 and RA frame 22 to be set to the normal connection state (NORM mode). The line concentrator 1-D does not receive the RA frame 22 although it receives the BR frame 21. Thus, the line concentrator 1-D assumes the TAIL mode. Consequently, the test ring including the line concentrators 1-B, 1-C and 1-D is formed.

Figure 10I:
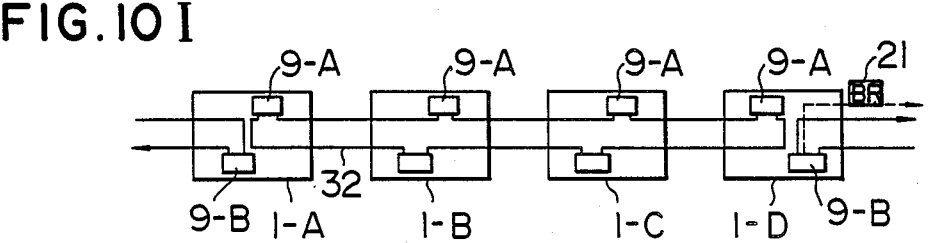

FIG. 10I shows extension of the operating ring by linking thereto the operating ring 32 (including the line concentrators 1-A and 1-B) and the test ring 31. The line concentrator 1-D in the TAIL mode continues to send out the BR frame 21 to the first ring transmission line 3B.

Figure 10J:
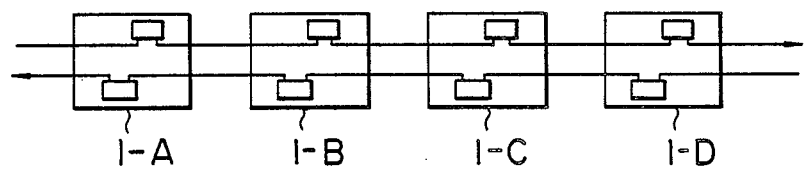

FIG. 10J shows the state in which extension of the network has been completed. In this state, all the line concentrators are in the NORM mode and capable of conducting communication only through the first ring transmission line 3A.

Figure 16:
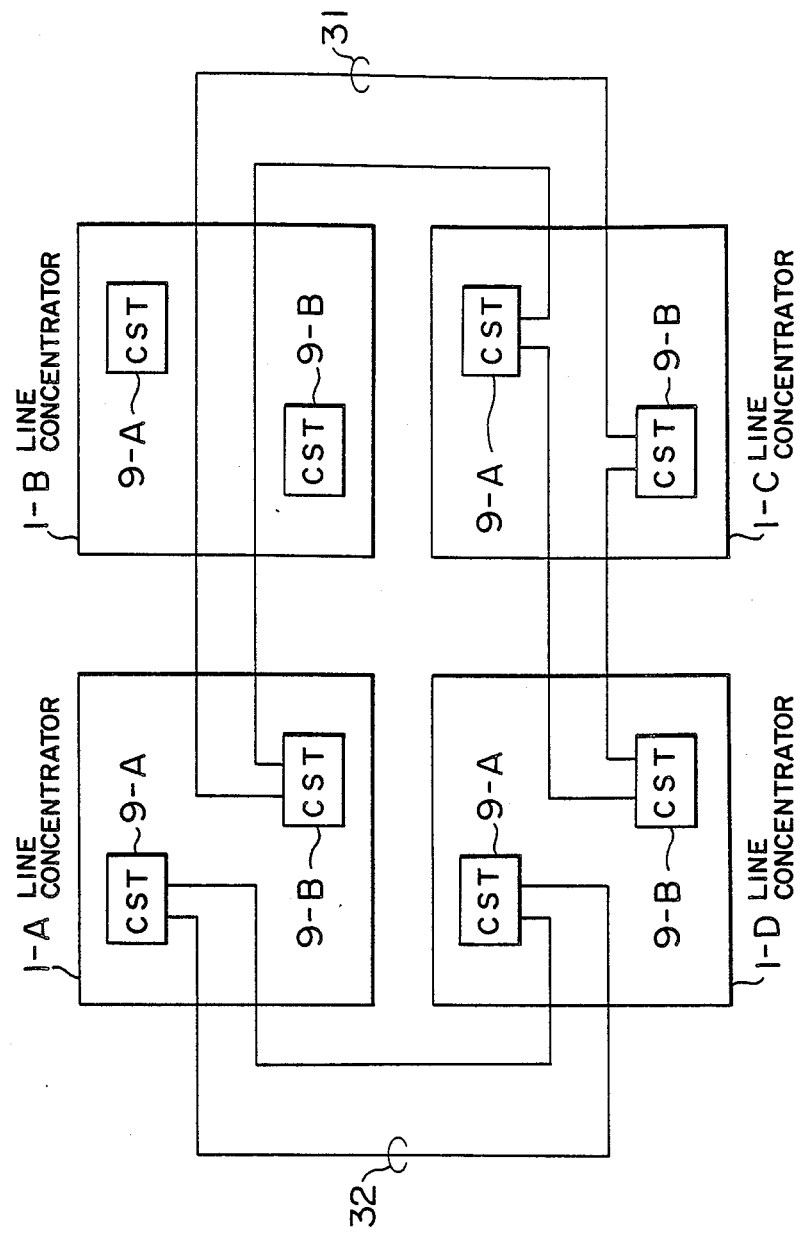
FIG. 16 is a view for illustrating the state in which an operating ring and a test ring are established through the network extending process.

The features characterizing the instant embodiment of the invention described above will be best understood from FIG. 16. The line concentrators 1-A and 1-D are already activated, and the ring 32 is established to allow the communication between these line concentrators. Further, it will be seen in FIG. 16 that when the line concentrator 1-C is newly activated with the line concentrator 1-B being not yet activated, the test ring including the line concentrators 1-A, 1-C and 1-D (the resting line concentrator 1-B is not included) is established independent of the ring 32 which is in the operating state. In other words, the rings 31 and 32 are established independently without exerting influence to each other. In connection with the establishment of the test ring 31, it should be noted that the line concentrators included in this test ring need not be located adjacent to each other. Further, it is to be noted that more than three line concentrators can be included in one and the same test ring.

Figure 17A:
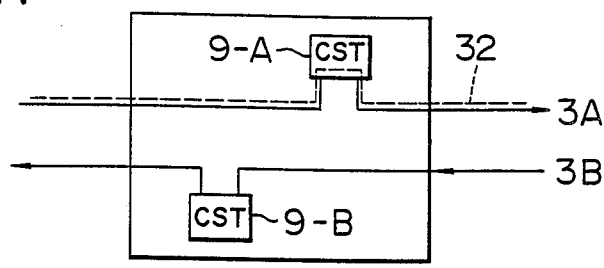
FIGS. 17A to 17D are views for illustrating the states of a line concentrator as well as relationships to the operating ring in the NORM mode, ISOL mode, HEAD mode and the TAIL mode, respectively.
Figure 17B:
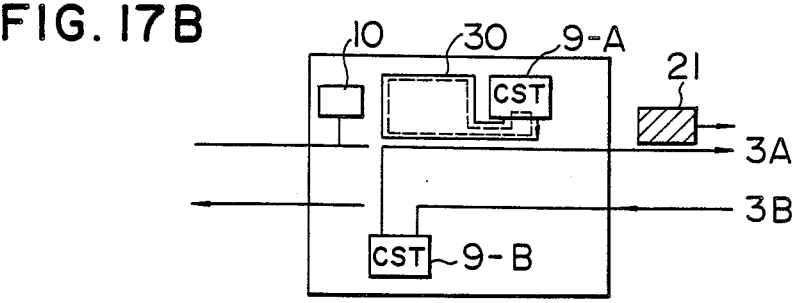

FIGS. 17A to 17D illustrate the internal states of the line concentrators in the modes "NORM", "ISOL", "HEAD" and "TAIL", respectively. In these figures, broken lines indicate the rings which are in the operating state. Referring to FIG. 17A, the line concentrator in the mode "NORM" is in the position to communicate with other line concentrator through the first ring transmission line 3A. In the case of the line concentrator in the mode "ISOL", only the local ring 30 is in the operating state, as is shown in FIG. 17B. Accordingly, communication is allowed only among the terminal stations or STs (not shown) connected to the local ring. In this mode, the line concentrator continues to send out the BR frame 21 onto the first ring transmission line 3A. More specifically, in the case of the instant embodiment according to which each line concenrator is provided with two control STs (9-A and 9-B), one control ST 9-A serves to control the local ring 30, while the other control ST 9-B sends out the BR frame 21 to the first ring transmission line 3A. Since it is unclear whether activation of other line concentrators on the network occurs on the side upstream of the line concentrator under consideration or on the side downstream thereof, the state of the transmission line extending in the direction opposite to that of the transmission line to which the BR 21 is currently sent out is monitored by the activation signal detection circuit 10. Upon detection of activation of other line concentrator by the activation signal detection circuit 10, connection of the control ST 9-B is changed over to the direction of the ring transmission line in which activation of other line concentrator is detected by the circuit 10, as is illustrated in FIG. 10D.

Figure 17C:
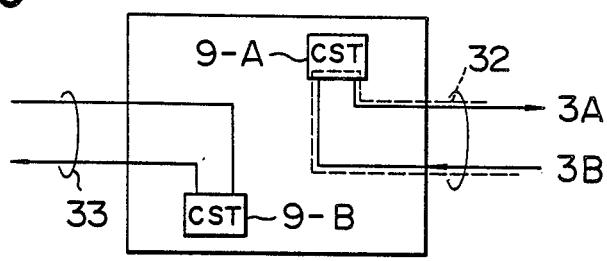
Figure 17D:
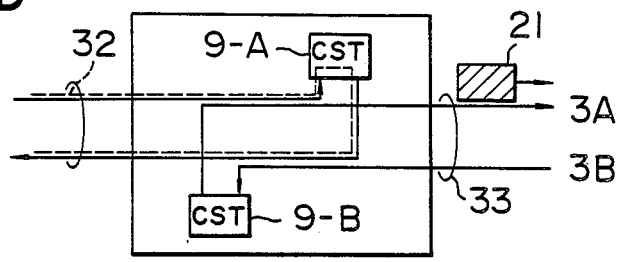

Referring to FIG. 17C, the line concentrator in the mode "HEAD" is positioned most upstream on the operating ring and loops back the data received from the second transmission line 3B of the operating ring to the first transmission line 3A. Further, upon reception of the BR frame from the first transmission line 3A of the resting ring 33, the RA frame is sent out on the second transmission line 3B. On the other hand, the line concentrator in the mode "TAIL" is positioned most downstream of the operating ring 32 and loops back the data received from the first transmission line 3A of the operating ring to the second transmission line 3B, as is illustrated in FIG. 17D. Further, the BR frame 21 continues to be sent onto the first transmission line 3A of the resting ring 33. Upon reception of the RA frame from the second transmission line 3B, it is decided that activation of the line concentrator has occurred newly on the resting ring.

FIGS. 18 to 21 illustrate control of the individual line concentrators for realizing the network configuration control described in the foregoing. The control operations are executed by the main control ST under cooperation of the sub-control ST.

Figure 18:
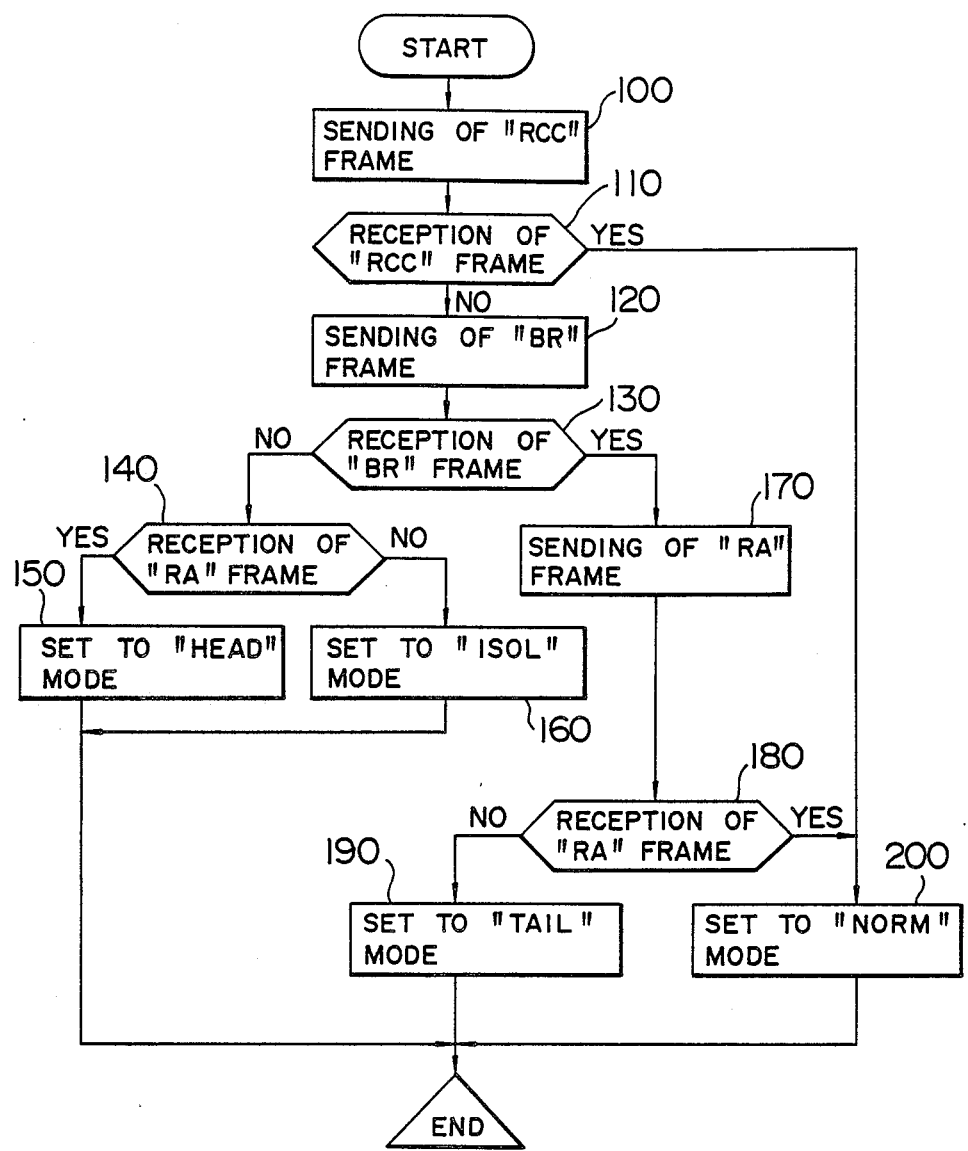
FIGS. 18 to 21 are views showing flow charts for illustrating control operations performed by individual line concentrators in realizing the network extension according to the teaching of the present invention.

More specifically, FIG. 18 shows a control flow for the mode setting which is executed upon activation of the line concentrator by connecting the power supply source thereto.

Referring to FIG. 18, the line concentrator upon being activated sends out the RCC frame onto the first transmission line to check whether the ring is closed or not (step 100). When the line concentrator under consideration receives the RCC frame sent out by that line concentrator itself, it is decided that the ring is closed (step 110), whereupon the line concentrator under consideration is set to the mode "NORM" (step 200). Unless the RCC frame is received, the line concentrator under consideration then sends out the BR frame (step 120). When the BR frame is not received within a predetermined time (step 130), it is decided that communication with other line concentrator on the first ring transmission line 3A located on the side of reception is impossible. Subsequently, reception of the RA frame is checked for determining whether communication with other line concentrator on the second ring transmission line located on the side of reception is possible or not (step 140). Upon reception of the RA frame, it is then decided that communication with the other line concentrator on the second ring transmission line 3B located on the side of reception is possible, whereby the mode "HEAD" is set (step 150). Unless the RA frame is received, it is decided that communication through the second ring transmission line 3B is impossible, whereby the mode ISOL is set (step 160). On the other hand, when the BR frame is received (step 130), it is decided that communication with other line concentrator on the first ring transmission line located on the side of reception is possible, whereupon the RA frame is sent out onto the second ring transmission line (step 170), after which reception of the RA frame is monitored (step 180). When the RA frame can not be received, the mode "TAIL" is set (step 190). Upon reception of the RA frame, the mode "NORM" is set (step 200).

Figure 19:
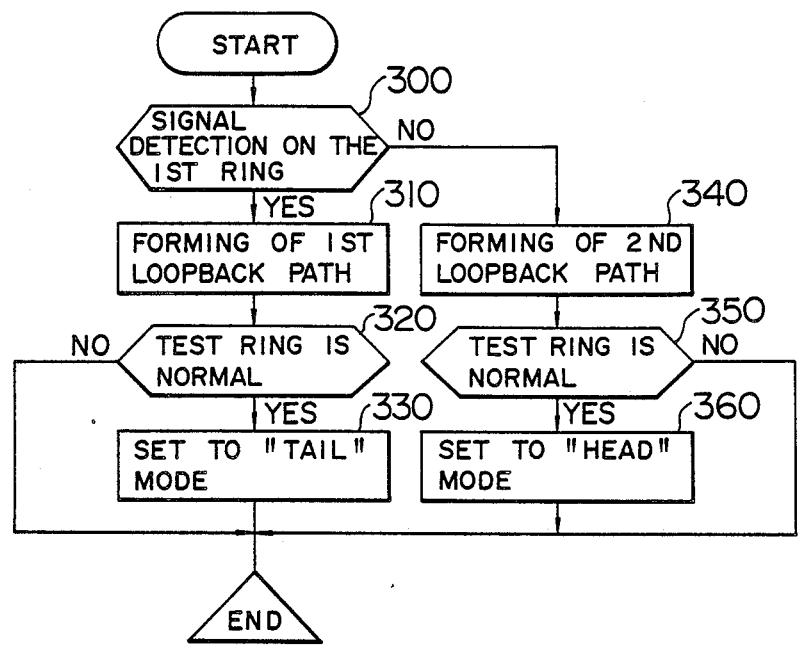

In the line concentrator set at the mode "ISOL" (e.g. the line concentrator 1-B shown in FIG. 10C), the control operation is performed in accordance with the flow chart shown in FIG. 19 when the activation signal detection circuit 10 detects the activation signal issued from other line concentrator. More specifically, referring to FIG. 19, when the activation signal is detected on the first ring transmission line at the reception side (step 300), the sub-control ST is connected to the first ring transmission line at the reception side to form a loop-back (step 310). When the normality of the test ring is confirmed (step 320), the line concentrator under consideration is set to the mode "TAIL" (step 330). On the other hand, when the activation signal on the second ring transmission is detected, the second ring transmission line is looped back (step 350). Thereafter, the line concentrator is set to the mode "HEAD" (step 360).

Figure 20:
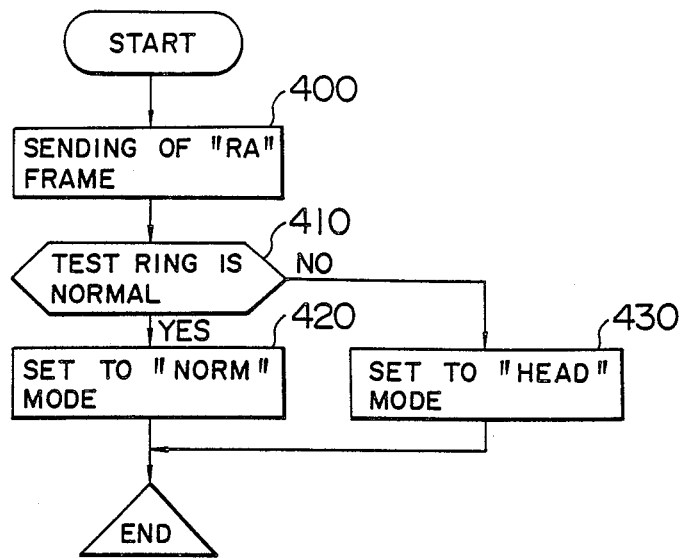

When the line concentrator in the mode "HEAD" (e.g. the concentrator 10A shown in FIG. 10) receives the BR frame from the first ring transmission line, the line concentrator first sends out the RA frame onto the second ring transmission line, as is illustrated in the flow chart of FIG. 20 (step 400), whereby the test ring is established on the first ring transmission line upstream of the line concentrator under consideration. Subsequently, the normality of the test ring is checked (step 410). When the normality of the test ring is ascertained, the operating ring formed already is linked to the test ring, whereupon the line concentrator is set to the mode "NORM" (step 420). Unless the test ring is normal, the mode "HEAD" is maintained (step 430).

Figure 21:
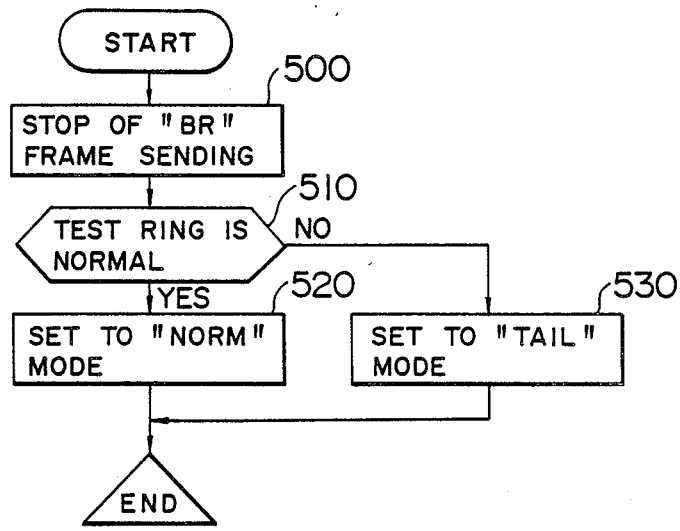

When the line concentrator in the mode "TAIL" (e.g. the concentrator shown in FIG. 10G) receives the RA frame from the second ring transmission line, the sending of the BR frame is stopped (step 500), as is shown in the flow chart of FIG. 21, and the test ring formed downstream of the line concentrator under consideration is checked as to the normality (step 510). When the normality is confirmed, the test ring is linked to the operating ring formed already, whereupon the line concentrator is set to the mode "NORM" (step 520). Unless the test ring is normal, the mode "TAIL" is maintained (step 530).

As will be appreciated from the foregoing description, since each line concentrator is so implemented according to the invention that the linking to other line concentrator disposed upstream and/or downstream through the double ring transmission lines and the linking or disconnection of the internal local ring to or from the double transmission lines can be selectively realized, it is possible to establish the operating ring portion and the test ring portion on the network independent of each other. By virtue of such arrangement, a ring portion to be newly added for extension of the network can be tested as to the normality of communication through this ring portion even at the MAC level. Further, monitoring of restoration from the faulty state or activation of the line concentrators can be conducted in a satisfactory and adequate manner. Further, since the above-mentioned test is conducted by forming the local ring separately and independently from the ring transmission line which is in the operating state, the test can be performed without exerting any influence to the network system in the operating state. Besides, since any line concentrator on the transmission ring can be arbitrarily activated, a plurality of the line concentrators can communicate with one another by way of the operating ring established by the activated line concentrators.

We claim:

1. A ring network system comprising:
    a plurality of line concentrator means each having at least one station connected thereto by a pair of branch lines; and
    at least one ring transmission path for interconnecting said plurality of line concentrator means in a ring configuration;
    wherein each line concentrator means includes
    an internal transmission line having a plurality of port means for connecting said pairs of branch lines to said internal transmission line, wherein each port means is connected to a pair of branch lines and wherein said internal transmission line interconnects each of said pairs of branch lines and said ring transmission path in series to each other; and
    switch means for disconnecting said internal transmission line from said ring transmission path to form a local ring which includes said pairs of branch lines and said internal transmission line while maintaining said ring transmission path in a conductive state at said each line concentrator means.

2. A ring network system according to claim 1, wherein said each line concentrator means further includes control means connected to said internal transmission line for controlling communication through said internal transmission line when said internal transmission line is in said local ring state.

3. A ring network system according to claim 2, wherein said each port means includes second switch means for selectively connecting or disconnecting said pair of branch lines connected thereto to or from said internal transmission line,
    wherein said control means performs an operation for detecting an abnormality within a local ring including said internal transmission line and said pair of branch lines connect to said each port means by controlling said second switch means.

4. A ring network system according to claim 1, wherein said at least one ring transmission path includes a first ring transmission line and a second ring transmission line for transmitting signals in directions opposite to each other,
    wherein said switch means includes means for establishing selectively a signal looping back path extending from said first ring transmission line to said second ring transmission line or from said second ring transmission line to said first ring transmission line.

5. A configuration control method for a ring network which includes a plurality of line concentrator means connected to at least one ring transmission path,
    wherein each line concentrator means includes
    an internal transmission line having a plurality of port means for correspondingly connecting a plurality of stations to said ring transmission path in series to each other, each of said stations being connected to one of said plurality of port means by a pair of branch lines, and switch means provided between said internal transmission line and said ring transmission path for closing said internal transmission line to form a closed local ring which includes said pairs of branch lines and said internal transmission line while maintaining said ring transmission path in a conductive state at said line concentrator means;

said configuration control method comprising the steps of:

separating said internal transmission line of the line concentrator means from said ring transmission path by said switch means so as to from said local ring upon detection of an abnormality by said line concentrator means with said ring transmission path while maintaining said ring transmission path in a state allowing signal transmission at said line concentrator means;

executing a diagnosis operation by the line concentrator means to identify the location in said local ring where the abnormality occurred; and connecting said internal transmission line to said ring transmission path in series by releasing said closed local ring by said switch means upon completion of said diagnosis operation.

6. A network configuration control method according to claim 5, wherein said internal transmission line separated from said ring transmission path constitutes a local ring in said line concentrator means.

7. A network configuration control method according to claim 5, further including a step of sending out an abnormality notification signal to said ring transmission path from said line concentrator means which detects an abnormality on said ring transmission path, wherein said line concentrator means, which can not receive said abnormality notification signal within a predetermined time, executes said separating, executing and connecting steps.

8. A network configuration control method according to claim 5, wherein said executing step includes a step of sending out a signal for diagnosing said closed local ring by selectively disconnecting said pair of branch lines and said internal transmission line, and a step of disconnecting from said internal transmission line a pair of branch lines in which an abnormal location is detected by said diagnosis operation thereby carrying out said connecting step and eliminating said abnormal location.

9. A configuration control method for a ring network which includes a plurality of line concentrator means connected to at least one ring transmission path, wherein each of said line concentrator means includes at least one pair of branch lines connected to a station, at least one controller for controlling signal transmission on said ring transmission path, an internal transmission line for connecting said at least one pair of branch line to said ring transmission path in series to each other, and switch means provided between said internal transmission line and said ring transmission path, said configuration control method comprising the steps of:

disconnecting said controller from said ring transmission path in one of said line concentrator means by said switch means when said each line concentrator means is set to a rest state with said ring transmission path being held in a conductive state to allow remaining line concentrator means in an active state to communicate through the ring transmission path passing through said each line concentrator means; and connecting said internal transmission line and said controller in series to said ring transmission line by said switch means when said each line concentrator means is in an active state.

10. A network configuration control method according to claim 9, further including the steps of:

sending out a test signal onto said ring transmission path by said controller when said each line concentrator is set to an operating state for diagnosing whether communication through said ring transmission path is possible or not; and forming in said each line concentrator means a closed local ring by disconnecting said internal transmission line from said ring transmission path by said switch means, while said ring transmission path is held in a state to allow signal transmission for the remaining line concentrator means in an active state, when said controller cannot normally receive said test signal within a predetermined time period.

11. A network configuration control method according to claim 10, wherein said at least one ring transission path includes first and second ring transmission lines having transmitting directions opposite to each other, and wherein said control method further includes the steps of:

sending out a first control signal to said first ring transmission line by a first one of said plurality of line concentrator means in which a local ring including the internal transmission line and the pair of branch lines has been formed;

sending out a second control signal onto said second ring transmission line by a second one of said plurality of line concentrator means which is in an active state;

forming a test ring by said first and second ring transmission lines by forming a loop-back path between said first and second ring transmission lines in dependence on combinations of reception and non-reception of said first and second control signals; and forming an extended local ring by combining said test ring and said local ring after said first and second one of said plurality of line concentrator means have been carried out a predetermined communication test in said test ring.

12. A ring network system comprising:

a plurality of line concentrator means each having at least one station connected thereto by a pair of a branch lines; and at least one ring transmission path for interconnecting said plurality of line concentrator means in a ring configuration;

wherein each line concentrator means includes an internal transmission line for interconnecting said pair of branch lines and said ring transmission path in seried to each other, a controller means connected to said internal transmission line for controlling the communication performed through the internal transmission line, and switch means for closing said internal transmission line to form a closed local ring including said station and said controller means independent from said ring transmission path while maintaining said ring transmission path in an operative state in which a signal is able to be transmitted on said ring transmission path passing through said line concentrator means.

13. A ring network system according to claim 12, wherein said pairs of branch lines includes means for bypassing said station when said station is in a power-off state.

14. A ring network system according to claim 13, wherein said switch means includes means for inserting said internal transmission line in said ring transmission path in series while bypassing said controller means when said controller means is in a power-off state.

15. A ring network system having a plurality of line concentrator means interconnected by a first ring transmission line and a second ring transmission line, said first and second ring transmission lines having signal transmission directions opposite to each other, and each of said line concentrator means accommodating at least one terminal station means, each line concentrator means comprising:
   an internal transmission line for interconnecting said at least one terminal stations to said first ring transmission line in series;
   a first controller means for controlling communications carried out through said internal transmission line;
   a second controller means for controlling communication carried out through said second transmission line; and
   switching means for changing connections between said internal transmission line, said first control means, said second controller means, said first ring transmission line and said second ring transmission line according to a status of said line concentrator means and said first ring transmission line,
   whereby a local ring including said internal transmission line and said first controller means is formed while said first and second ring transmission lines are maintained in a state in which signal transmission between two neighboring line concentrator means is permitted there-through.

16. A ring network system according to claim 15, wherein said switch means includes means for interconnecting said internal transmission line to said ring transmission path in series while bypassing said controller means when said controller means is in a power-off state.

17. A ring network system according to claim 15, wherein said switch means includes means for establishing selectively a signal looping back path extending from said first ring transmission line to said second ring transmission line or from said second ring transmission line to said first ring transmission line.

18. A ring network system having a plurality of line concentrator means interconnected by a first ring transmission line and a second ring transmission line, said first and second ring transmission lines having signal transmission directions opposite to each other, and each of said line concentrator means accommodating at least one terminal station means, each line concentrator means comprising:
   an internal transmission line connected to said first ring transmission line, for interconnecting said at least one terminal station means to said first ring transmission line;
   a first controller means for controlling communication carried out through said internal transmission line;
   a second controller means for controlling communication carried out through said second transmission line; and
   switching means for inserting said first controller in said internal transmission line when said line concentrator means is in a power-on state and for separating said first controller means from said internal transmission line when said line concentrator means is in a power-off state.

19. A ring network system according to claim 18, wherein each line concentrator means further comprises:
   second switching means connected between said internal transmission line and said first ring transmission line for disconnecting said internal transmission line from said first ring transmission line to form a closed local ring including said first controller means and said terminal stations while maintaining said first ring transmission line in an operative state in which a signal is able to be transmitted on said first ring transmission line passing through said line concentrator means.

20. A network configuration control method for a ring network which includes a plurality of node means interconnected by a first ring transmission line and a second ring transmission line, said first and second ring transmission lines having signal transmission directions opposite to each other, and each of said node means having an internal transmission line for interconnecting at least one terminal station to said ring network, for switching combinations of connections among said internal transmission line, first ring and second ring transmission lines and control means for generating control signals on said first and second ring transmission lines and for operating said switching means in accordance with the control signals received from said first and second ring transmission lines, said configuration control method comprising the steps of:
   maintaining said first and second ring transmission lines in a conductive state so as to permit communication therethrough for a node means when each of said means is set in a power-off state;
   transmitting a first control signal (RCC) to said first ring transmission line from one of said node means when said one node means is set in an active state in order to check whether said first control signal can circulate on said first ring transmission line;
   operating said one node means in a mode in which the station connected thereto can carry out communication by using said first ring transmission line if said first control signal has returned through said first ring transmission line;
   transmitting a second signal (BR) to said first ring transmission line from said one node means in order to check whether another active node means exists in the ring network if said first control signal is determined not to return;
   transmitting a third control signal (BA) to said second ring transmission line from another node means which has been set in the active state in response to said second control signal and forming a first loop-back path from said first ring transmission line to said second ring transmission line by said another node means;
   forming a second loop-back path from said second ring transmission line to said first ring transmission line by said one node means in response to said third control signal whereby a closed local ring is formed between said one node means and said another node means;

testing normality of communication in said closed local ring by said one node means and said another node means; and operating said one node means and said another node means in a node in which terminal stations connected thereto can carry out communication by using said closed local ring if normality in said closed local ring is confirmed.

21. A network configuration control method according to claim 20, further comprising the step of:

combining said closed local ring with another closed local ring with another closed local by said another node means after said testing step if said another node means has been operating by using said another local ring when said second control signal is received, whereby said communication is carried out on an extended closed local ring.

22. A network configuration control method according to claim 20, wherein said one node forms a closed local ring which includes a terminal station under control of said one node means independent from said first and second ring transmission lines if said one node means could not receive said third control signal from said second ring transmission line within a predetermined time period after said one node means began to transmit said first control signal, and waits for the second control signal from said second ring transmission line and the third control signal from said second ring transmission line while transmitting the second control signal to said first ring transmission line.

* * * * *

UNITED STATES PATENT AND TRADEMARK OFFICE
CERTIFICATE OF CORRECTION

PATENT NO. : 4,899,142
DATED : February 6, 1990
INVENTOR(S) : S. NAKAYASHIKI et al It is certified that error appears in the above-identified patent and that said Letters Patent is hereby corrected as shown below:

In claim 20 (column 20, line 29), insert --switching means-- after "network,"

In claim 20 (column 21, line 7), delete "node" and insert --mode--

Signed and Sealed this

Seventeenth Day of September, 1991

Attest:

HARRY F. MANBECK, JR.

*Attesting Officer*      *Commissioner of Patents and Trademarks*